(12) United States Patent
Lee et al.

(10) Patent No.: US 11,965,986 B2
(45) Date of Patent: Apr. 23, 2024

(54) LIGHT-RECEIVING DEVICE AND LIDAR

(71) Applicant: LG INNOTEK CO., LTD., Seoul (KR)

(72) Inventors: Chang Hyuck Lee, Seoul (KR); Lee Im Kang, Seoul (KR); Ji Sung Kim, Seoul (KR); Yang Hyun Joo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 129 days.

(21) Appl. No.: 17/582,586

(22) Filed: Jan. 24, 2022

(65) Prior Publication Data

US 2022/0155443 A1 May 19, 2022

Related U.S. Application Data

(63) Continuation of application No. 16/320,402, filed as application No. PCT/KR2017/008002 on Jul. 25, 2017, now Pat. No. 11,262,439.

(30) Foreign Application Priority Data

Jul. 25, 2016 (KR) .................. 10-2016-0094259
Aug. 5, 2016 (KR) .................. 10-2016-0100209

(51) Int. Cl.
*G01C 3/08* (2006.01)
*G01S 7/481* (2006.01)
*G01S 7/486* (2020.01)
*G01S 7/4865* (2020.01)
*G01S 17/14* (2020.01)
(Continued)

(52) U.S. Cl.
CPC ............ *G01S 7/486* (2013.01); *G01S 7/4816* (2013.01); *G01S 7/4865* (2013.01); *G01S 17/14* (2020.01); *G01S 17/89* (2013.01); *G01S 17/93* (2013.01); *G01S 17/931* (2020.01); *G02B 3/00* (2013.01); *G02B 3/02* (2013.01); *G02B 7/02* (2013.01); *G02B 7/105* (2013.01); *G02B 13/0025* (2013.01); *G02B 13/16* (2013.01); *G02B 27/30* (2013.01)

(58) Field of Classification Search
None
See application file for complete search history.

(56) References Cited

U.S. PATENT DOCUMENTS 5,461,451 A 10/1995 Seki et al.
9,529,079 B1 * 12/2016 Droz .................. G01S 7/484
(Continued)

FOREIGN PATENT DOCUMENTS

CN 1164652 A 11/1997
CN 1238839 A 12/1999
(Continued)

*Primary Examiner* — Mark Hellner
(74) *Attorney, Agent, or Firm* — Birch, Stewart, Kolasch & Birch, LLP

(57) ABSTRACT

An optical device includes a light receiving element for detecting light reflected and transmitted from a subject; a voltage part for providing a first bias voltage or a second bias voltage to the light receiving element; and a controller for controlling the voltage part so that the second bias voltage provided from the voltage part is synchronized with a light output of a light emitting part to be provided to the light receiving element.

19 Claims, 17 Drawing Sheets

(51) Int. Cl.
  *G01S 17/89* (2020.01)
  *G01S 17/93* (2020.01)
  *G01S 17/931* (2020.01)
  *G02B 3/00* (2006.01)
  *G02B 3/02* (2006.01)
  *G02B 7/02* (2021.01)
  *G02B 7/105* (2021.01)
  *G02B 13/00* (2006.01)
  *G02B 13/16* (2006.01)
  *G02B 27/30* (2006.01)

(56) References Cited

U.S. PATENT DOCUMENTS

| | | | |
|---|---|---|---|
| 9,618,622 | B2 | 4/2017 | Geiger et al. |
| 2002/0093638 | A1 | 7/2002 | Seifert et al. |
| 2010/0328517 | A1 | 12/2010 | Mathieu |
| 2015/0055117 | A1 | 2/2015 | Pennecot et al. |
| 2017/0031009 | A1* | 2/2017 | Davidovic ............ G01S 7/4865 |

FOREIGN PATENT DOCUMENTS

| | | | | |
|---|---|---|---|---|
| CN | 101978304 A | | 2/2011 | |
| CN | 102650726 A | | 8/2012 | |
| CN | 203893070 U | | 10/2014 | |
| CN | 105659108 A | | 6/2016 | |
| JP | 6-109464 A | | 4/1994 | |
| JP | 7-306260 A | | 11/1995 | |
| JP | 9-178852 A | | 7/1997 | |
| JP | 9-258099 A | | 10/1997 | |
| JP | 2010-74626 A | | 4/2010 | |
| JP | 2010286032 A | * | 12/2010 | ............. G01S 17/10 |
| JP | 2011-100113 A | | 5/2011 | |
| KP | 10-2011-0126896 A | | 11/2011 | |
| KR | 10-2002-0009078 A | | 2/2002 | |
| KR | 20040062334 A | * | 7/2004 | ......... H01L 3/02027 |
| KR | 10-2011-0033816 A | | 3/2011 | |
| KR | 10-2013-0056574 A | | 5/2013 | |
| KR | 10-2016-0043109 A | | 4/2016 | |
| WO | WO 2016/021384 A1 | | 2/2016 | |

* cited by examiner

LIGHT-RECEIVING DEVICE AND LIDAR

CROSS REFERENCE TO RELATED APPLICATIONS

This application is a Continuation of U.S. application Ser. No. 16/320,402 filed on Jan. 24, 2019, which is the National Phase of PCT International Application No. PCT/KR2017/008002, filed on Jul. 25, 2017, which claims priority under 35 U.S.C. 119(a) to Patent Application No. 10-2016-0094259, filed in the Republic of Korea on Jul. 25, 2016, and to Patent Application No. 10-2016-0100209, filed in the Republic of Korea on Aug. 5, 2016, all of which are hereby expressly incorporated by reference into the present application.

TECHNICAL FIELD

The present invention relates to a high efficient light-receiving device configured to increase efficiency of light incident at an angle of wide angle, relates to a light-receiving device configured to effectively increase a dynamic range, and relates to a lidar comprising the same.

BACKGROUND ART

Recently, fields of intelligent vehicle and smart cars require proactive vehicular response functions in order to cope with unexpected circumstances. That is, there is a need to beforehand ascertain circumstances that menace safety of drivers and pedestrians such as recognition of sudden emergence of pedestrians, advance detection of obstacles at a place deviated from illumination during dark night, detection of obstacles under deteriorated illumination of headlight when it rains, or detection of road destruction.

To meet these requirements, a scanner is used which is installed on a windshield or a front side of a vehicle to ascertain an object based on emitted light source and to warn a driver in advance, to transmit an image, which is a base for the vehicle to stop by itself or to avoid the object, to an ECU (Electronic Control Unit) and to obtain the image.

The conventional scanner has used a RaDAR (Radio Detection and Ranging) device. The RaDAR is a radio detection system that uses radio waves (ultrahigh frequency of 10 cm to 100 cm waves) to determine the range, direction, altitude, or velocity of objects by receiving the electromagnetic waves reflected from the objects, and is used for vehicular scanner. However, there are drawbacks because the RaDAR is expensive and therefore is not easy to be used for various types of vehicles.

In order to solve the aforesaid drawbacks, scanners using LiDAR (Light Detection and Ranging) have been developed. The LiDAR, a surveying method that measures distance to a target or an atmospheric phenomenon by illuminating a target with pulsed laser light and measuring the reflected pulses with a sensor using reflectors or scatterers, is also called a laser Lidar. Measurement of time of reflected light is calculated by clock pulses, and 5-m resolution with a bandwidth of 30 MHz and 1-m resolution with a bandwidth of 150 MHz.

A sensor in the Lidar must stably receive a signal of various directions, i.e., a signal incident from wide angles. To be more specific, a vehicular Lidar requires an increased efficiency of light incident at a wide angle (corresponding to a range of about +70 degrees to −70 degrees to X axis and a range of about +3.4 degrees to −3.4 degrees to Y axis) at all angles comprised in relevant ranges.

In order for the typical vehicular Lidar to receive signals of all lights incident at the said wide angle above a predetermined level, a coaxial method has been used that moves along a light receiving part and a light-emitting part through a motor.

However, this motor method suffers drawbacks in that manufacturing cost is increased due to synchronization of a light-receiving part and a light-emitting part, addition of a motor, and overall size of modules is also increased as well. Moreover, when a same cover lens is used for the light-receiving part and the light-emitting part, another drawback is that it is difficult to obtain an enhanced performance of light receiving part due to scattering. Furthermore, a Lidar module typically uses a high-sensitivity APD (Avalanche Photo Diode) for increased measurement distance. However, when the APD is used, it may be advantageous in terms of measurement of small amount of lights, but may encounter a "dead zone" having a physical limitation that fails to respond to a large amount of lights.

Thus, the problem of dead zone boils down to a problem of dynamic range of a detector disposed on a Lidar module, resulting in disruption of accurate measurement of Lidar.

DISCLOSURE

Technical Problem

An object of first exemplary embodiment is to provide a high efficient light receiving lens configured to increase an efficiency of light incident at an angle of wide angles to above a predetermined level.

Another object of first exemplary embodiment is to provide a high efficient light receiving lens configured to maintain a light efficiency to above a predetermined level even if an incident angle is increased, by allowing light having passed through a lens of defocusing method to have a predetermined area on a sensor surface.

Still another object of first exemplary embodiment is to provide a high efficient light receiving lens adequate to a sensor responding to a quantity of light above a predetermined level by disposing a defocusing lens that is not great in changed rate of quantity of transmitting light even if an incident angle of light is changed.

An object of second exemplary embodiment is to provide a light-receiving device configured to increase a dynamic range capable of increasing the dynamic range by changing a gain of a light receiving element.

Another object of second exemplary embodiment is to provide a light-receiving device configured to increase a dynamic range provided to a light receiving element by allowing a bias voltage changing a gain of a light receiving element to be synchronized with a light output of a light emitting element.

Still another object of second exemplary embodiment is to provide a light-receiving device configured to increase a dynamic range solving a dead zone problem that is unresponsive to a relatively large quantity of light when an APD is used.

Technical Solution

In order to solve the aforesaid technical problems, a light receiving lens module according to a first exemplary embodiment may comprise:

a light receiving lens formed with a first lens surface for receiving light from an outside, and a second lens surface for changing a path of the light received by the first lens surface and outputting the light to the outside, wherein at least one or more line segments formed by allowing cross-sections comprising an optic axis of the light receiving lens and the second lens surface to be met may have a predetermined curvature, and at least one line segment formed by allowing cross-sections comprising an optic axis of the light receiving lens and the second lens surface to be met may be a line segment that changes in curvature.

In the first exemplary embodiment, at least one or more line segments formed by allowing the cross-sections comprising an optic axis of the light receiving lens and the first lens surface to be met may have a predetermined curvature.

In the first exemplary embodiment, the light receiving lens module may further comprise a sensor for detecting light sequentially passing through the first lens surface and the second lens surface by being incident on the light receiving lens from an outside, wherein the light having reached the light receiving lens may be defocused to allow being reached in a shape having a predetermined area on a sensing area of the sensor.

In the first exemplary embodiment, the predetermined area may be changed in response to at least one or more of incident angle of X axis relative to the first lens surface and an incident angle of Y axis relative to the first lens surface.

In the first exemplary embodiment, the incident angle of X axis may comprise a range of maximum +70°~-70°.

In the first exemplary embodiment, the incident angle of Y axis may comprise a range of maximum +4°~-4°.

In the first exemplary embodiment, the light having sequentially passed through the first lens surface and the second lens surface may reach a position distancing from a center of the sensor as at least one or more of incident angles in the incident angle of X axis relative to the first lens surface, and the incident angle of Y axis relative to the first lens surface increase through the defocusing.

In the first exemplary embodiment, the sensor may be disposed on the optic axis.

In the first exemplary embodiment, the light receiving lens may have a positive (+) refractive index.

In the first exemplary embodiment, the light receiving lens module may further comprise: a separate lens or a separate structure interposed between the sensor and the second lens surface to increase an efficiency of light incident on the sensor.

In the first exemplary embodiment, the light receiving lens module may further comprise: at least one or more connection parts formed on a surface connecting the first lens surface and the second lens surface to physically connect the light receiving lens and the light receiving part.

In the first exemplary embodiment, at least each one or more of the connection parts may comprise at least one or more protrusions.

In order to solve the aforesaid problems, a light receiving lens comprising a first lens surface and a second lens surface for allowing light incident from an outside to reach a sensor according to another first exemplary embodiment may be such that a curvature of a line segment formed by allowing a first virtual plane to meet the first lens surface may be constant, a curvature of a line segment formed by allowing a second virtual plane to meet the first lens surface may be constant, a curvature of a line segment formed by allowing a first virtual plane to meet the second lens surface may be constant, and a curvature of a line segment formed by allowing a second virtual plane to meet the second lens surface may not be constant, when an optic axis extended to a height direction of the light receiving lens is defined as a Z axis, an axis perpendicular to the Z axis to form an intersection point by passing through one point on the Z axis and extended to a lengthwise direction of the lens is defined as an X axis, an axis perpendicular to the X axis and the Z axis to penetrate an intersection point of the X axis and the Z axis and to be extended to a widthwise direction of the lens is defined as a Y axis, a virtual plane comprising the X axis and the Z axis is defined as a first virtual plane, and a virtual plane comprising the Y axis and the Z axis is defined as a second virtual plane.

In order to solve the aforesaid problems, an optical device according to a second exemplary embodiment of the present invention may comprise:

a light receiving element for detecting light reflected and transmitted from a subject;

a voltage part providing a first bias voltage or a second bias voltage to the light receiving element; and a controller for controlling the voltage part so that the second bias voltage provided from the voltage part is synchronized with a light output of a light emitting part to be provided to the light receiving element.

In the second exemplary embodiment, the second bias voltage may comprise a voltage in which a sub bias voltage is added to the first bias voltage.

In the second exemplary embodiment, the sub bias voltage may be comprised in a range of +50V~-50V.

In the second exemplary embodiment, the sub bias voltage may comprise an AC-shaped or pulse-shaped voltage that changes to a time.

In the second exemplary embodiment, the controller may be such that the light emitting part and the voltage part may be simultaneously inputted with a seed signal, and the voltage part may output the second bias voltage based on a time when the seed signal is inputted.

In order to solve the aforesaid problems, a Lidar module according to another second exemplary embodiment may comprise:

a light receiving element for detecting light reflected and transmitted from a subject;

a first voltage part for providing a bias voltage to the light receiving element;

a second voltage part for providing a sub bias voltage to the light receiving element; and a controller for controlling the second voltage part so that the sub bias voltage is synchronized with a light output of a light emitting part to be provided to the light receiving element.

In order to solve the aforesaid problems, a Lidar module according to another second exemplary embodiment of the present invention may comprise:

a light receiving element for detecting light reflected and transmitted from a subject;

a first voltage part for providing a bias voltage to the light receiving element;

a second voltage part for providing a sub bias voltage to the light receiving element; and an MPD (Monitoring Photo Diode) for controlling the second voltage part so that a light output outputted from a light emitting part to be synchronized with the light output detected with the sub bias voltage and to be provided to the light receiving element.

In the second exemplary embodiment, the sub bias voltage may be comprised in a range of maximum +50V~-50V.

In the second exemplary embodiment, the sub bias voltage may comprise an AC-shaped or pulse-shaped voltage that changes to a time.

In the second exemplary embodiment, the controller may be such that the light emitting part and the second voltage part may be simultaneously inputted with a seed signal, and the second voltage part may output the sub bias voltage based on a time when the seed signal is inputted.

In the second exemplary embodiment, the monitoring photo diode may input a seed signal to the second voltage part in response to the detected light output, and the second voltage part may output the sub bias voltage based on a time when the seed signal is inputted.

Advantageous Effects

According to at least one of the first exemplary embodiments, efficiency of light incident at an angle of wide angle can be increased to a predetermined level.

Furthermore, according to at least one of the first exemplary embodiments, a light efficiency can be maintained to above a predetermined level even if an incident angle is increased, by allowing light having passed through a lens of defocusing method to have a predetermined area on a sensor surface.

Furthermore, according to at least one of the first exemplary embodiments, a sensor responding to a quantity of light above a predetermined level may be adequate by disposing a defocusing lens that is not great in changed rate of quantity of transmitting light even if an incident angle of light is changed.

Furthermore, according to at least one of the second exemplary embodiments, a dynamic range can be increased by changing a gain of a light receiving element.

Furthermore, according to at least one of the second exemplary embodiments, a bias voltage changing a gain of a light receiving element may be synchronized with a light output of a light emitting element and may be provided to a light receiving element.

Furthermore, according to at least one of the second exemplary embodiments, a dead zone problem that is not responding to a relatively large quantity of light can be solved when an APD is used.

BEST MODE

Figure 1:
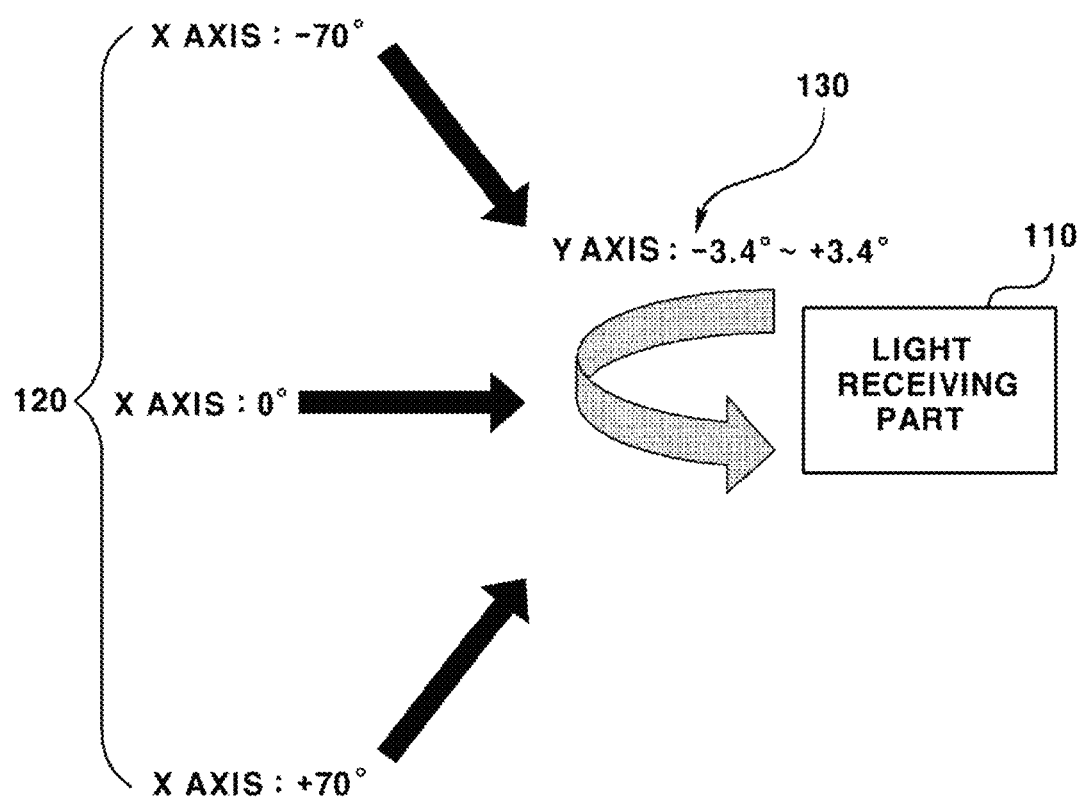
FIG. 1 is a schematic view illustrating an example of receiving a light incident on with a wide angle corresponding to a range of about +70°~−70° to an X axis, and a range of about +3.4°~−3.4° to a Y axis in a vehicular Lidar.

Hereinafter, exemplary embodiments of the present invention will be described in detail with reference to the accompanying drawings, where same or like elements will be provided with same reference numerals regardless of drawing signs and redundant explanation thereto will be omitted. As used herein, the suffixes 'module', and 'part' may be used for elements in order to facilitate the disclosure. Significant meanings or roles may not be given to the suffixes themselves and it is understood that the 'module', and 'part' may be used together or interchangeably. Furthermore, in describing the present invention, detailed descriptions of constructions or processes in explaining exemplary embodiments that are known in the art may be omitted to avoid obscuring appreciation of the invention with unnecessary detail regarding such known constructions and functions. Still furthermore, the accompanied drawings used herein are for the purpose of helping an easy appreciation of exemplary embodiments disclosed in the specification only and are not intended to be limiting of the general inventive concept, and it will be appreciated that various modifications, additions and substitutions comprised in the general inventive concept are possible, without departing from the scope and spirit of the invention as disclosed in the accompanying claims.

It will be understood that, although the terms first, second, etc. may be used herein to describe various elements, these elements should not be limited by these terms. These terms are only used to distinguish one element from another.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. As used herein, the terms "a" and "an" are open terms that may be used in conjunction with singular items or with plural items.

The terms "comprises," "comprising," "comprising," and "having," are inclusive and therefore specify the presence of stated features, integers, steps, operations, elements, and/or components, but do not preclude the presence or addition of one or more other features, integers, steps, operations, elements, components, and/or groups thereof.

The present invention comprises four exemplary embodiments. The first exemplary embodiment relates to a light-receiving device using a defocused first lens and a Lidar. The second, the third and fourth exemplary embodiments relate to an optical device and a Lidar configured to increase a dynamic range by changing a gain of light receiving element, and to solve a dead zone unresponsive to a relatively large quantity of lights using an APD as a light receiving element.

First, the first exemplary embodiment will be described. Hereinafter, in describing the first exemplary embodiment, an "optic axis" may mean an optic axis of first lens (100)". The "optic axis" may be formed to a vertical direction (up/down direction). "a major axis of first lens" and a minor axis of first lens" may be axes orthogonal to an "optic axis" on the first lens, and may be axes mutually orthogonal to each other on the first lens. "a major axis of first lens" and a minor axis of first lens" may be disposed on a plane surface perpendicular to the "optic axis". Although only one "optic axis" may be existent, the "major axis of first lens" and a minor axis of first lens" may be existent in a plural number as long as the abovementioned conditions are satisfied. A length of "major axis of first lens" may be longer than that of the "minor axis of first lens". In the Orthogonal Coordinate System shown on the drawings, z axis may be an "axis parallel with the optic axis", x axis may be one of the "major axes of first lens", and y axis may be one of the "minor axes of first lens".

FIG. 1 is a schematic view illustrating an example of receiving a light incident on with a wide angle corresponding to a range of about +70°~−70° to an X axis, and a range of about +3.4°~−3.4° to a Y axis in a vehicular Lidar.

As described above, in the fields of intelligent vehicle and smart cars, signals of various directions must be received from, for example, a distance recognition sensor and/or a motion recognition sensor, that is, signals of wide angle must be received in order to proactively respond to unexpected circumstances.

As illustrated in FIG. 1, a light receiving part (110) disposed on a Lidar mounted on a vehicle must receive light incident on from a wide angle corresponding to a range (120) of about +70°~−70° to an X axis, and a range (130) of about +3.4°~−3.4° to a Y axis at all angles comprising relevant ranges on a relatively constant base.

Hereinafter, exemplary embodiments of present invention will be described in detail with reference to the accompanying drawings. It should be readily apparent to those of skill in the art that the invention may be embodied in other particular modifications within the spirit and scope of the invention.

However, the first lens (200) described through FIGS. 2 to 6 simply illustrate only essential elements in introducing characteristic functions of the present invention, and therefore it should be readily apparent to those of skill in the art that other various elements may be comprised in the invention. The first lens (200) may be called a "high efficient light receiving lens".

Figure 2:
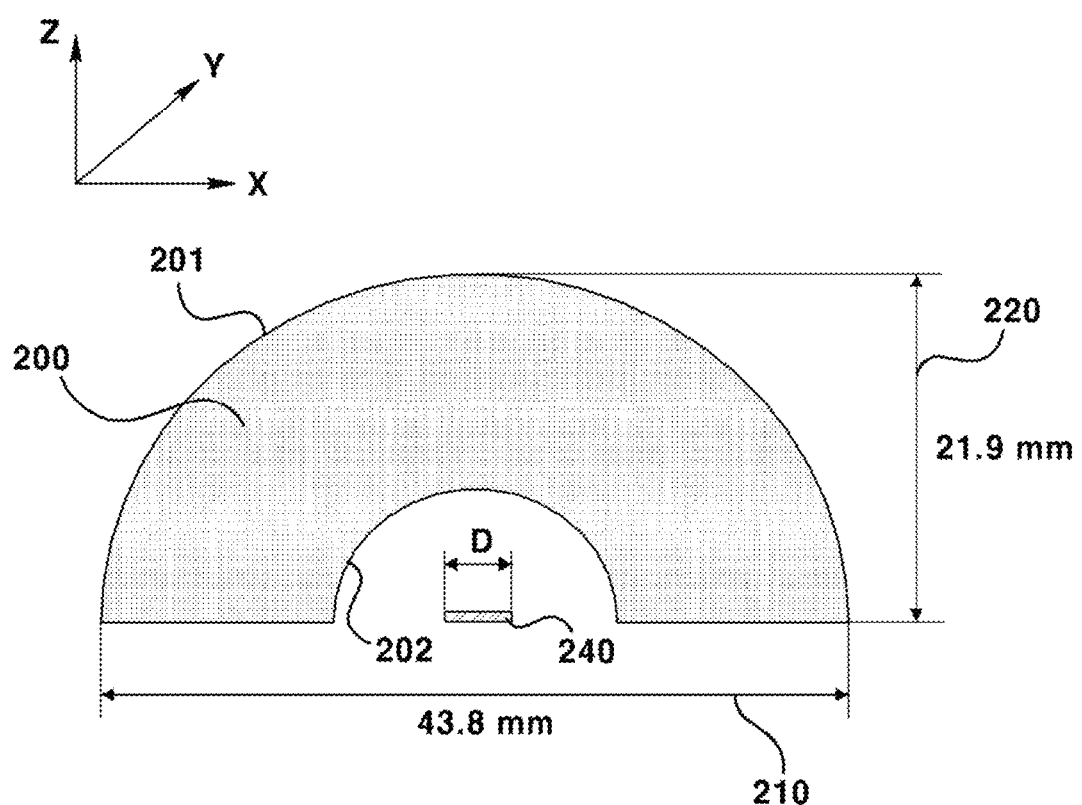
FIG. 2 is a schematic view illustrating a first cross-section of a first lens according to a first exemplary embodiment of present invention.

FIG. 2 is a schematic view illustrating a first cross-section of a first lens (200) according to a first exemplary embodiment of present invention. Here, the first cross-section may be a cross-section to a major axis direction of first lens (200). Thus, the first cross-section may be in plural number. The first cross-section illustrated in FIG. 2 among the plurality of first cross-sections may be a first cross-section comprising all the x axis and y axis.

Referring to FIG. 2, the first lens (200) may comprise a first lens surface (201) and a second lens surface (202). As illustrated in FIG. 2, the first lens surface (201) on the first cross-section may be formed with a convex shape to a light source (or subject) direction, and the second lens surface (202) may be formed with a concave shape to a sensor (240) direction or with a convex shape to a light source (or subject) direction.

The first lens surface (201) on the first cross-section may have a spherical shape. Now, the spherical shape of first lens surface (201) will be described in more detail. At least one line segment in the line segments formed by allowing the cross-sections comprising an optic axis of first lens (200) and the first lens surface (201) to meet may have a predetermined curvature.

Here, the optic axis may be a path of light that does not generate refraction, and according to other expressions, the optic axis may mean a central axis to a vertical direction of first lens (200). Meantime, the first lens surface (201) on the first cross-section may substantially and evenly accept the quantity of light incident at all angles comprising a range of maximum +70°~−70° to an X axis due to a relevant hemispheric shape of the first lens surface.

The first lens (200) according to the first exemplary embodiment may have a positive (+) refractive index.

On the other hand, a sensor (240) may be disposed underneath the second lens surface (202). To be more specific, it is preferable that the sensor (240) be disposed at a center of hemispheric shape or semi-circular shape, which is the shape of first lens surface (201) or the second lens surface (202) on the first cross-section. The center of hemispheric shape or semi-circular shape may be a center of a sphere or a circle at a time when a complete sphere or circle is formed by extending the given hemisphere or semi-circle. Furthermore, a center of sensor (240) may be disposed at a center of hemispheric or semi-circular shape. Furthermore, the sensor (240) may be downwardly (z axis direction of FIG. 2) spaced apart from the center of hemispheric or semi-circular shape.

Furthermore, as a detailed exemplary embodiment, a length (210) to an x axis direction of high efficient light receiving lens (200) according to the first exemplary embodiment may be 43.8 mm, and a distance to the first lens surface (201) from a center of hemispheric shape, which is a radius length (220) of relevant hemispheric shape, may be 21.9 mm which is half the length of 43.8 mm. Furthermore, the sensor (240) may be downwardly (−Z axis direction of FIG. 2) spaced apart from a center of hemispheric shape by about 2 mm to 5 mm.

Meantime, a ratio of length of first lens (200) cut through the first cross-section, to be more specific, a ratio between a radius length (200) of hemispheric shape and a length (210) to an x axis direction of first lens (200) may be variably changed within a range satisfying 1:21.9. To be more specific, it is preferable that a relevantly cut length ratio comprise 1:25 to 1:35.

Furthermore, when thickness (reference numeral 230 of FIG. 3) of first length (200) according to the first exemplary embodiment, a radius length (220) of first lens surface (201), or diameter (210) is increased, or a total surface area of lens is increased, a total quantity of light accepted into the lens may be increased, and as a result, it is preferable that a diameter (D) of sensor detecting an incident light be increased.

Figure 3:
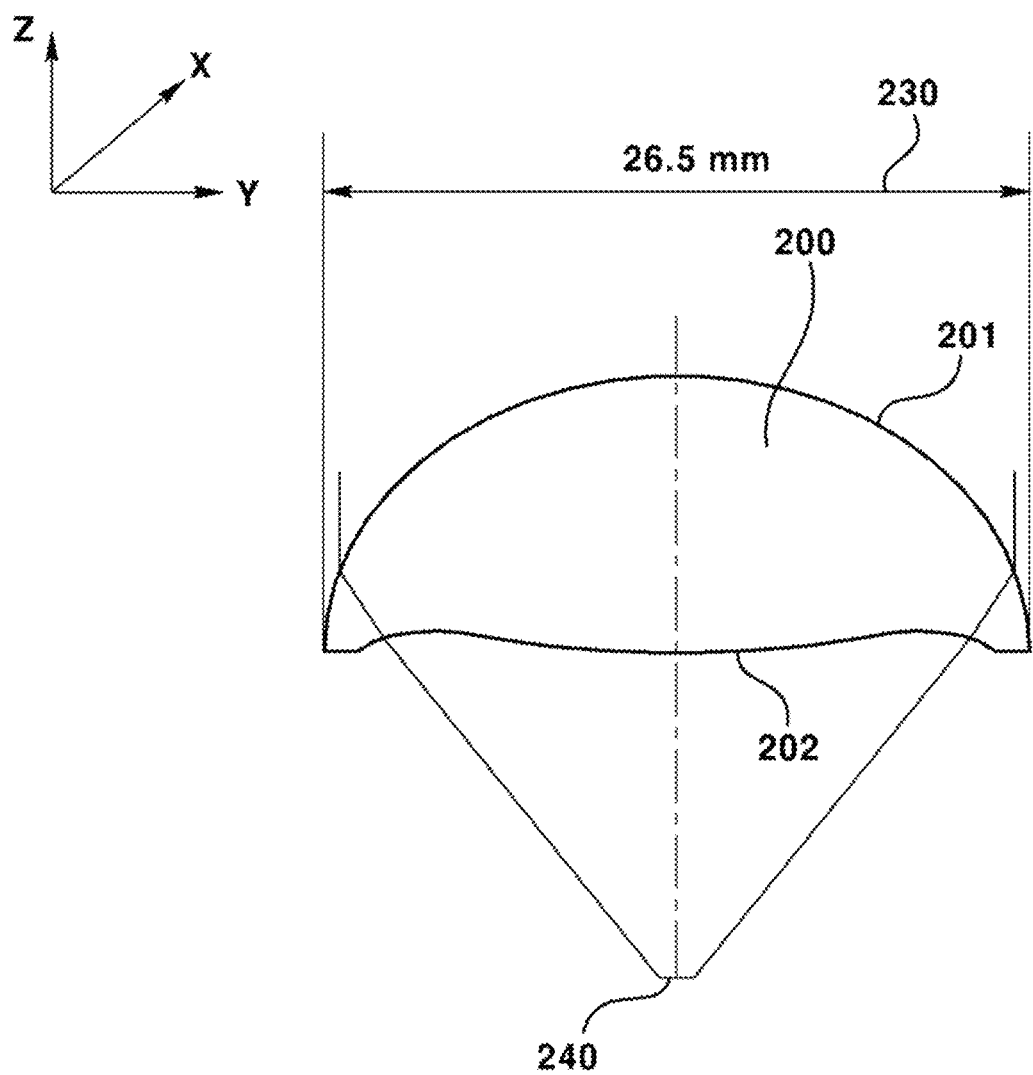
FIG. 3 is a schematic view illustrating a second cross-section of a first lens according to a first exemplary embodiment of present invention.

FIG. 3 is a schematic view illustrating a second cross-section of a first lens (200) according to a first exemplary embodiment of present invention. Here, the second cross-section may be a cross-section to a minor axis direction of first lens (200). Hence, the second cross-section may be in plural number. The second cross-section illustrated in FIG. 3 in the plurality of second cross-sections may be a second cross-section comprising all the y axis and z axis.

Referring to FIG. 3, a first lens surface (201) on the second cross-section may have a spherical shape, and the second lens surface may have an aspherical shape.

Now, the aspherical shape of second lens surface (202) will be described in more detail. At least one line segment in the line segments formed by allowing the cross-sections comprising an optic axis (z axis) of first lens (200) and the second lens surface (202) to meet may have a non-predetermined curvature.

Meantime, the second lens surface (202) on the second cross-section may increase efficiency of light incident at +4° to −4° to a y axis direction due to relevant aspheric shape.

The first lens (200) according to the first exemplary embodiment may be deviated in focus from a sensor surface (410) of sensor (240). In this case, the first lens (200) may be so disposed as to allow the focus to be defocused to the sensor surface (410) of sensor (240) and to optic axis direction (z axis). As a result, light having passed the first lens (200) may arrive on the sensor surface (410) of sensor (240) with a shape having a predetermined area (not spot).

Thickness (230) of first lens surface (201) may be 26.5 mm in the spherical shape of first lens surface (201) on the second cross-section of first lens (200) according to the first exemplary embodiment.

Meantime, the predetermined area reached to a sensing region of the sensor (240) by the defocusing may be changed by at least one of an incident angle of x axis to the first lens surface (201) and an incident angle of y axis to the first lens surface (201).

It is preferable that the incident angle to x axis comprise a range of +70°~−70°, and an incident angle to y axis comprise a range of +4°~−4°. Explanation thereto will be continued through the following FIGS. 4 and 5.

Figure 4:
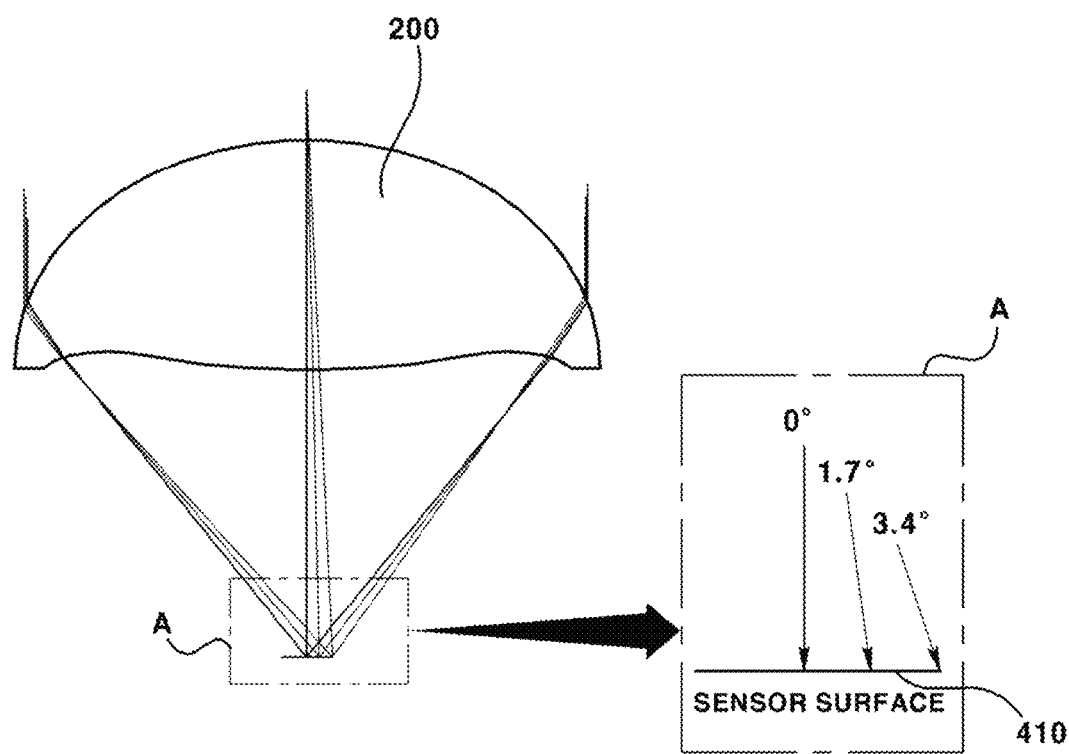
FIG. 4 illustrates an example of incident angle being distanced from a center of a sensor surface, as an incident angle of a light incident on a first lens is increased according to a first exemplary embodiment of present invention.

FIG. 4 illustrates an example of incident angle being distanced from a center of a sensor surface, as an incident angle of a light incident on a first lens is increased according to a first exemplary embodiment of present invention.

It can be observed from FIG. 4 that an incident angle of y axis to the first lens surface (201) among incident angles incident on the first lens (200) of first exemplary embodiment is distanced from a center of sensor surface (410) when sequentially increased from 0 degree, 1.7 degree and 3.4 degrees.

Thus, if a focus of first lens (200) is so arranged as match to the sensor surface (410) of sensor (240), the focus may be concentrated to one spot to reach the sensor surface (410). Hence, light incident at 3.4 degree toy axis direction may not be detected because being incident outside of sensor surface (410).

Figure 5:
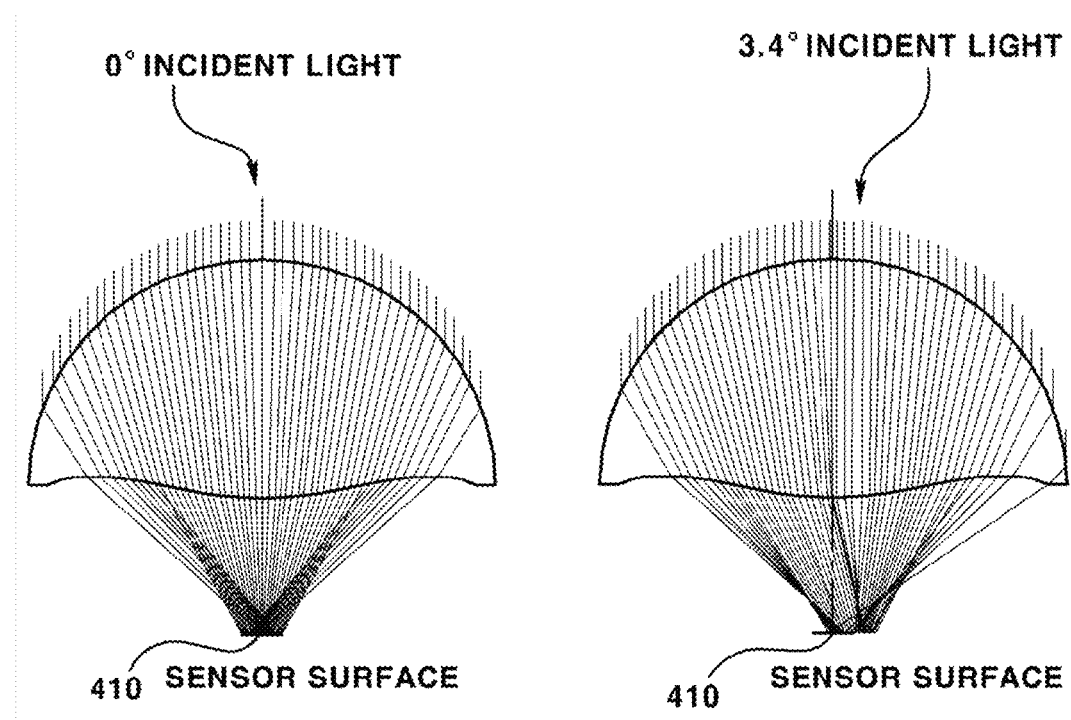
FIG. 5 is a schematic view illustrating an example of an area disposed on a sensor surface being distanced from a center of the sensor surface when a first lens is defocused according to a first exemplary embodiment of present invention.

In contrast, the light incident on the sensor surface (410) through the defocusing of first lens (200) of the aforementioned first exemplary embodiment can be incident to an area which is not a spot. FIG. 5 is a schematic view illustrating an example of light incident on a high efficient light receiving lens according to the first exemplary embodiment being defocused and incident on a sensor surface.

Referring to FIG. 5, in the first lens (200) according to a first exemplary embodiment, when an incident angle toy axis relative to the first lens surface (201) is increased to 3.4° compared with 0°, light having passed through the second lens surface (202) may reach a position distanced from a center (B) of sensor surface (410), but at least a portion can be sensed and detected because of being incident, not on a spot, but on a surface.

Meantime, it can be ascertained that the predetermined area on which light having passed the second lens surface (202) reaches a sensing area of sensor (240) may be changed depending on at least one of incident angle of x axis relative to the first lens surface (201) and incident angle of y axis relative to the first lens surface (201).

For example, when a lens is formed with PMMA (polymethylmethacrylate), and a light source is moved to a range of +70°~−70° to x axis at a distance spaced apart by 30 m from the sensor (240), and a light source is moved to a range of +4°~−4° to y axis, a light corresponding to a power of 1 W can be outputted, and when a diameter of sensing surface (410) of sensor (230) is 2 mm, the quantity of light incident on the sensor (240) may be 3 nW.

At this time, when an incident angle is 0°, a diameter of predetermined area of light that has passed the second lens surface (410) disposed at the sensor surface (410) may be about 2.2 mm, and when an incident angle is 3.4°, a diameter of predetermined area of light having passed the second lens surface (202) disposed on the sensor surface (410) may be about 2.1 mm.

That is, when the diameter of sensor surface (410) of sensor is about 2 mm, and when an incident angle is 0°, the light having passed the second lens surface (202) may reach the sensor surface (410) at an area ratio of about 90%, and when an incident angle is 3.4°, light having passed the second lens surface (202) may reach the sensor surface (410) at an area ratio of about 60%.

Various exemplary embodiments of incident angle of x axis relative to the first lens surface (201) related thereto and incident angle of y axis relative to the first lens surface (201) may be referred to the following Table 1.

TABLE 1

| quantity of incident light on sensor | | | | | |
|---|---|---|---|---|---|
| incident angle | | Focusng lens sensor | defocusing lens sensor | change rate of quantity of light for each angle | |
| horizontal | vertical | diameter (2 mm) | diameter (2 mm) | Focusng lens | defocusing lens |
| 0° | 0° | 9.10E−09 | 8.87E−09 | 1.17229E−09 | 3.00617E−10 |
| 0° | 3.4° | 5.11E−09 | 7.85E−09 | | |

TABLE 1-continued quantity of incident light on sensor

| incident angle | | Focusng lens sensor | defocusing lens sensor | change rate of quantity of light for each angle | |
|---|---|---|---|---|---|
| horizontal | vertical | diameter (2 mm) | diameter (2 mm) | Focusng lens | defocusing lens |
| 45° | 0° | 4.32E−09 | 6.92E−09 | 8.23E−10 | 2.78942E−10 |
| 45° | 3.4° | 1.52E−09 | 5.97E−09 | | |
| 70° | 0° | 2.04E−09 | 3.18E−09 | 3.41305E−40 | 5.62705E−11 |
| 70° | 3.4° | 8.79E−10 | 2.99E−09 | | |

Meantime, various exemplary embodiments are shown as in the following Table 2 for a case of using a first lens according to the first exemplary embodiment in the detailed examples and a case of no lens.

TABLE 2

| incident angle | | case of no lens | case of using a lens | | |
|---|---|---|---|---|---|
| | | sensor size | sensor size | sensor size | sensor size |
| horizontal(x) | vertical(y) | (2 mm) | (1 mm) | (1.5 mm) | (2 mm) |
| 0° | 0° | 1.44E−09 | 1.98E−09 | 4.22E−09 | 8.87E−09 |
| 45° | 0° | 9.61E−10 | 1.29E−09 | 3.18E−09 | 6.92E−09 |
| 70° | 0° | 5.24E−40 | 8.62E−40 | 1.61E−09 | 3.18E−09 |
| 0° | 3.4° | 1.40E−09 | 2.52E−09 | 4.09E−09 | 7.85E−09 |
| 45° | 3.4° | 9.17E−10 | 2.16E−09 | 4.09E−09 | 5.97E−09 |
| 70° | 3.4° | 6.11E−40 | 9.46E−40 | 1.25E−09 | 3.01E−09 |

That is, the defocused first lens (200) may be adequate to a sensor (410) that reacts to a predetermined quantity of light whose change rate in quantity of light is not greatly changed as shown in Tables 1 and 2, even if an incident angle of light is changed.

Figure 6:
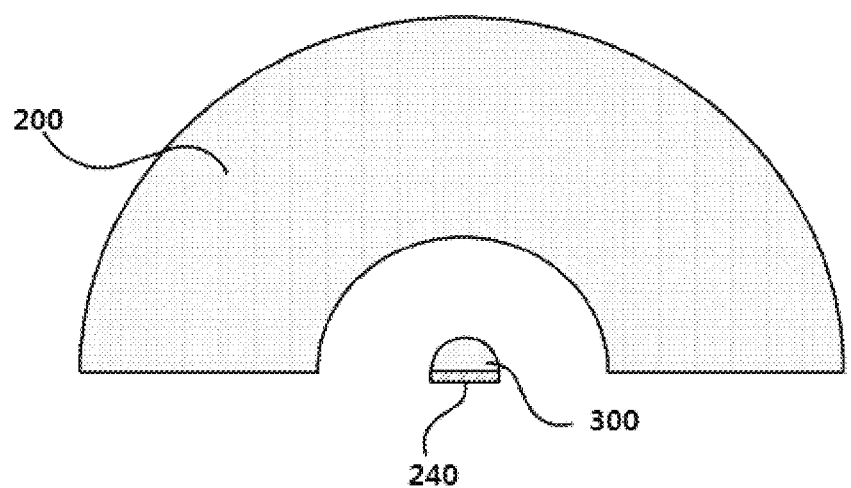
FIG. 6 is a schematic view when a second lens or a mechanism is added between a first lens and an image sensor according to a first exemplary embodiment of present invention.

FIG. 6 is a schematic view when a mutually different lens or a mechanism is added between a first lens (200) and an image sensor (410) according to a first exemplary embodiment of present invention in order to increase the efficiency of light incident on the sensor (401).

Referring to FIG. 6, as described before, the sensor (410) may be disposed at a lower center part of first lens (200). Here, a separate different lens or an optical mechanism (300) may be additionally disposed between the first lens (200) and the sensor (410) in order to increase an optical (light) efficiency.

To be more specific, FIG. 6 illustrates an example where a hemispheric shape of second lens (300) is interposed between the first lens (200) and the sensor (240).

In the detailed examples according to the Tables 1 and 2, various exemplary embodiments are shown in the following Table 3 for a case where only the first lens (200) is used and a case where the second lens (300) is additionally used.

TABLE 3 incident quantity of light for a sensor when a hemispheric lens was added (W)

| | | Sensor size | | | | | | | | |
|---|---|---|---|---|---|---|---|---|---|---|
| | | 1 mm | | | | | 1.5 mm | | 2 mm | |
| horizontal | vertical | Ref. | hemisphere 2 mm | hemisphere 2.2 mm | hemisphere 2.5 mm | hemisphere 3 mm | Ref. | hemisphere 2.2 mm | Ref. | hemisphere 2.2 mm |
| 0° | 0° | 1.98E−09 | 3.73E−09 | 4.03E−09 | 3.79E−09 | 4.26E−09 | 4.22E−09 | 8.72E−09 | 8.87E−09 | 2.09E−08 |
| 45° | 0° | 1.29E−09 | 2.87E−09 | 2.86E−09 | 2.65E−05 | 2.72E−09 | 3.18E−09 | 7.35E−09 | 6.92E−09 | 1.30E−08 |
| 70° | 0° | 8.62E−10 | 1.44E−09 | 1.46E−09 | 1.44E−09 | 1.52E−09 | 1.61E−09 | 3.52E−09 | 3.18E−09 | 6.53E−09 |
| 0° | 3.4° | 2.52E−09 | 4.72E−09 | 4.59E−09 | 4.98E−09 | 4.60E−09 | 4.09E−09 | 8.79E−09 | 7.85E−08 | 1.28E−08 |
| 45° | 3.4° | 2.16E−09 | 3.43E−09 | 3.45E−09 | 2.97E−09 | 3.53E−09 | 4.09E−09 | 4.93E−09 | 5.97E−09 | 1.03E−08 |
| 70° | 3.4° | 9.46E−10 | 1.73E−09 | 1.87E−09 | 1.46E−09 | 1.54E−09 | 1.25E−09 | 3.35E−09 | 2.99E−09 | 5.57E−09 |

That is, when a second lens (300) of PMMA material is disposed on the sensor (240), the quantity of light incident on the sensor (240) may be increased as shown in Table 3. To be more specific, when a radius of second lens (300) is about 2.2 mm, it can be ascertained that the optical efficiency increases by about two times over an optical efficiency when the second lens (300) is not available (Ref).

Meantime, the sensor (240) of FIG. 6 may be also downwardly (−z axis direction in FIG. 2) spaced apart by about 2 mm~5 mm from a center of hemispheric shape as explained in the foregoing.

FIGS. 7 to 10 are schematic views illustrating an example where a first lens according to a first exemplary embodiment of present invention is actually embodied.

Figure 7:
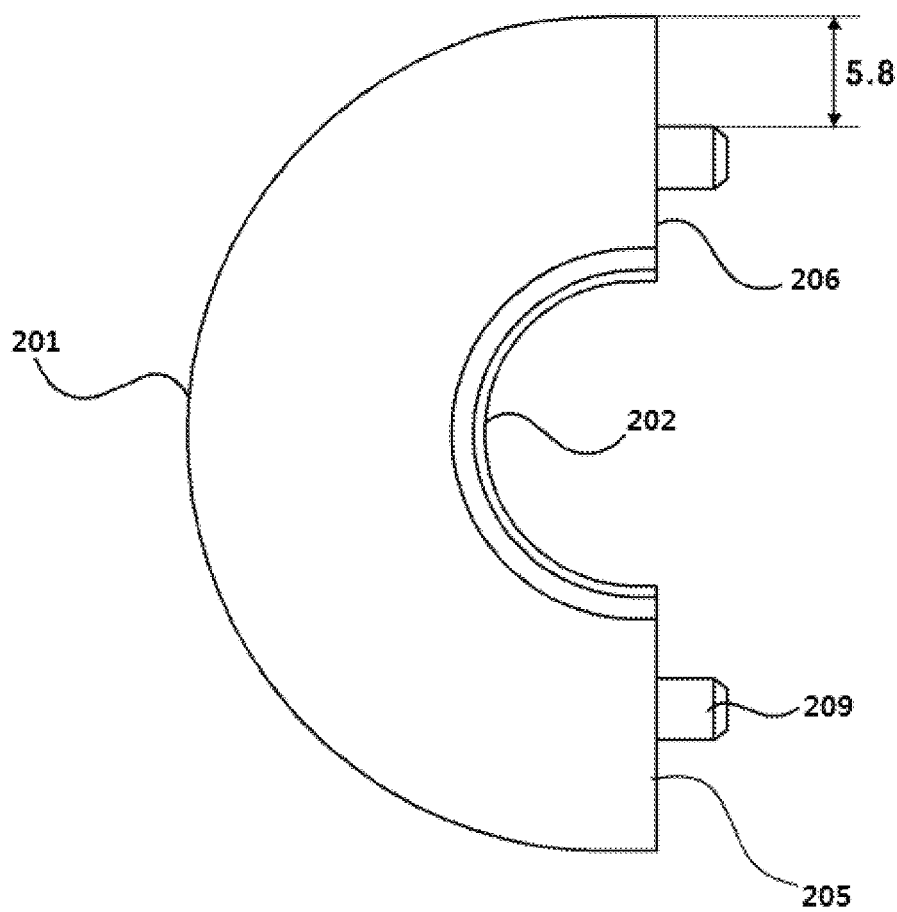
FIGS. 7 to 10 are schematic views illustrating an example where a first lens according to a first exemplary embodiment of present invention is actually embodied.

First, as illustrated in FIG. 7, the first cross-section of aforementioned FIG. 2 can be ascertained in more detail. To be more specific, the high efficiency light receiving lens of FIG. 7 may comprise a third plane surface (205) connecting the first lens surface (201) and the second lens surface (202) and a plurality of support legs (209).

Here, the plurality of relevant support legs (209) is an element to allow the first lens according to the present invention to be physically connected to the light receiving part formed with a sensor, and may be disposed at a position spaced apart by about 5.8 mm on a first cross-section from a distal end of the first lens surface (201) as illustrated in FIG. 7.

Figure 8:
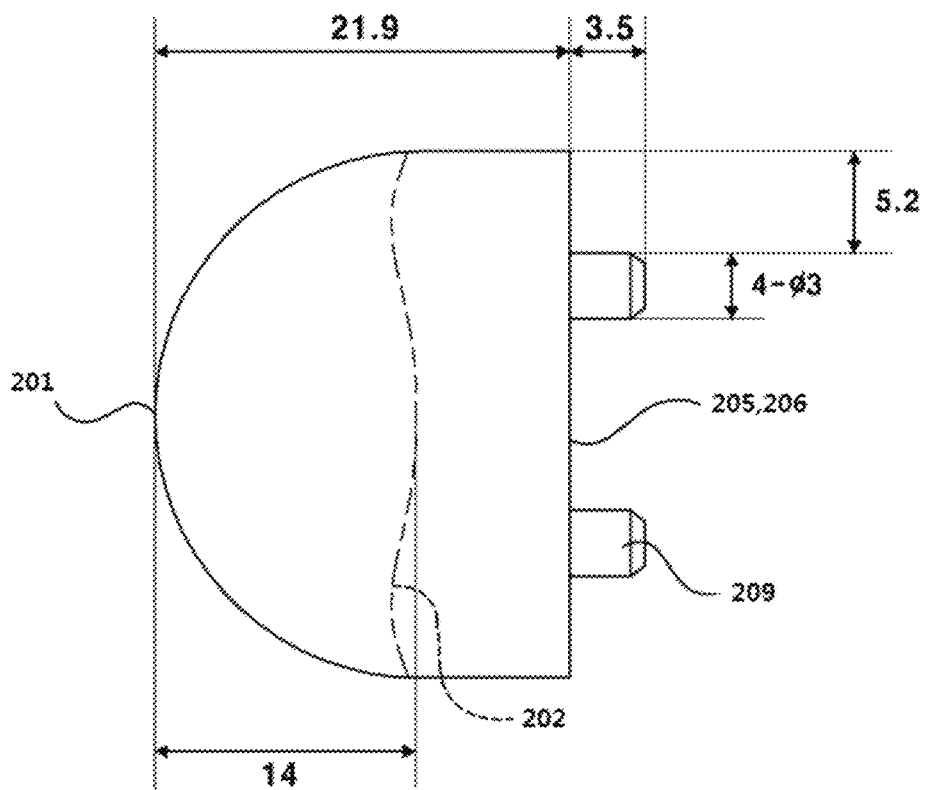

Next, the aforementioned second cross-section of FIG. 3 may be more specifically ascertained if referred to FIG. 8.

As shown in FIG. 8, the plurality of support legs (209) may be disposed at a position spaced apart by about 5.2 mm on the second cross-section from a distal end of first lens surface (201). Furthermore, a thickness of each of the plurality of support legs (209) may be about 4-Ø3 mm, and a length protruded from a third plane surface (205) and a fourth plane surface (206) connecting the first lens surface (201) and the second lens surface (202) by the plurality of support legs may be about 3.5 mm.

Meantime, a distance spaced apart on the optic axis by the first lens surface (201) and the second lens surface (202) may be about 14 mm, and a radius length of relevant hemispheric shape, which is a distance from a center of the hemispheric shape to the first lens surface (201), may be, as discussed above, about 21.9 mm.

Figure 9:
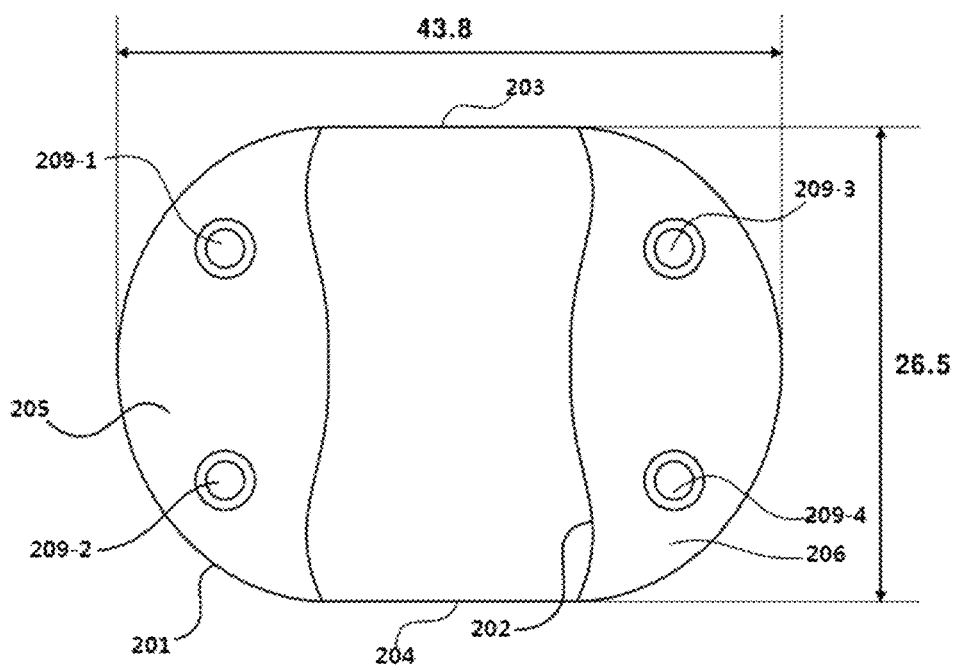

Next, the third plane surface (205) and the fourth plane surface (206) connecting the first lens surface (201) and the second lens surface (202) mentioned through FIGS. 7 and 8 among the plurality of surfaces forming the first lens (200) according to the first exemplary embodiment may be specifically ascertained in detail from FIG. 9.

Meantime, a length to an x axis (X axis of FIG. 2) of first lens according to the first exemplary embodiment may be about 43.8 mm as explained through FIG. 2, and a thickness of first lens surface (201) formed on the first lens (200) may be about 26.5 mm, as elaborated through FIG. 3.

Figure 10:
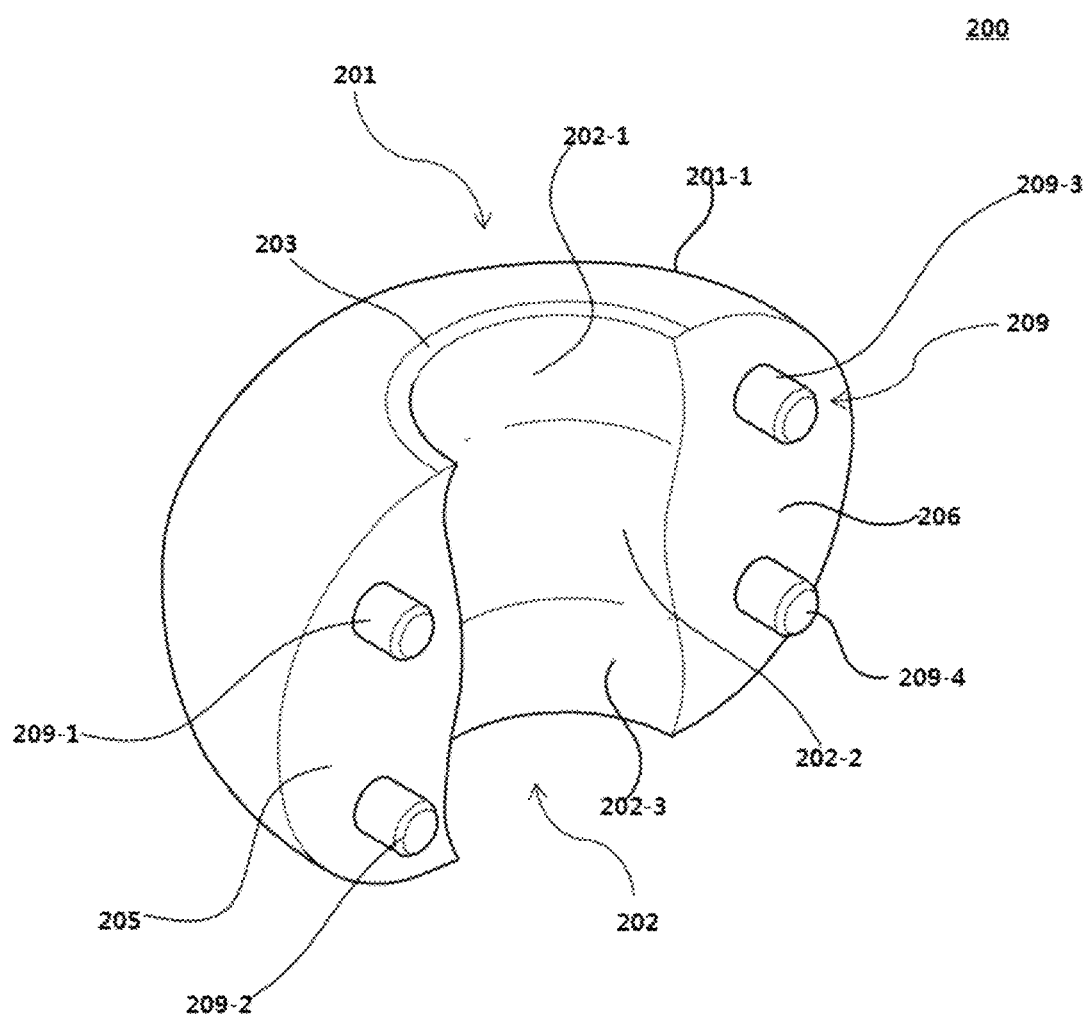

Lastly, a 3D (3 dimensional) shape of first lens according to the present invention explained via 2D (2 dimensional) shape through FIGS. 7 to 9 may be ascertained from FIG. 10.

To be more specific, it is preferable that actually realized examples of first lens explained through FIGS. 7 to 10 satisfy the numerical values described in the following Tables 4 and 5 and the equation 1, where S1 and S2 respectively denote the spherical first lens surface (201) and the aspherical second lens surface (202).

TABLE 4

| Name | Rainbow Lens |
|---|---|
| Material | PMMA |
| Effective Diameter | Surface-S1: >24.8 |
| | Surface-S2: >26.5 |
| coating(Surface_S2) | Transmission band(T >90%): 900~910 nm |
| | Blocking range(T <0.5%): 600~1100 nm |
| | AOI of lens top surface: −4'~+4' |
| | AOI of lens bottom surface: −20'~+20' |
| Coating Diameter | Surface-S1: >24.8 |
| | Surface-S2: >26.5 |
| Effective Focal Length | 18.65 mm |
| Surface S2 & S2(P-V) | Figure(Design R): <50 um |
| Surface Quality(MIL.) | MIL 80-50 |

Here, the coating of the second lens surface (202) may be so configured as to perform a bandpass function for detecting only the wavelength pre-set by the first lens (200) according to the first exemplary embodiment.

TABLE 5

| | S1 | S2 |
|---|---|---|
| Y Curvature | 0.0753843126 | −0.0521044905 |
| Y Radius | 13.2653593961 | −19.1922037933 |
| Conic Constant(K) | — | — |
| A(4th) | — | 0.0001549820 |
| B(6th) | — | 3.6450096648e−08 |
| C(8th) | — | — |

$$z = \frac{y^2}{R(1 + \sqrt{1 - (1+K)y^2/R^2})} + B4y^4 + \quad \text{[Equation 1]}$$
$$B6y^6 + B8y^8 + B10y^{10} + B12y^{12} + B14y^{14}$$

The Equation 1 denotes a numerical expression for aspheric surface, where R may be −19.1922037933, K may be 0, B4 may be 0.0001549820, B6 may be 3.6450096648e−8, and B10, B12 and B14 may be respectively 0.

The first lens (200) according to the first exemplary embodiment of the present invention may be explained as under in more detail with reference to FIGS. 7 to 10.

First, an optic axis extended to a height direction of first lens (200) may be defined as z axis (e.g., z axis of FIG. 2), an axis perpendicular to the z axis to pass through one spot on the z axis and to form an intersection and extended to a lengthwise direction of first lens may be defined as an x axis (e.g., x axis of FIG. 2), an axis perpendicular to x axis and z axis to pass through an intersection between x axis and z axis and extended to widthwise direction of first lens may be defined as y axis (e.g., y axis of FIG. 2), a virtual plane surface comprising a relevant x axis and z axis may be defined as a first virtual plane surface (e.g., a first cross-section of FIG. 2), and a virtual plane surface comprising a relevant y axis and z axis may be defined as a second virtual plane surface (e.g., a second cross-section of FIG. 3).

At this time, as illustrated in FIGS. 7 to 10, a curvature of line segment formed by the first virtual plane surface to meet the first lens surface of first lens may be constant, and a curvature of line segment formed by the second virtual plane surface to meet the first lens surface of first lens may be constant.

Furthermore, a curvature of line segment formed by the first virtual plane surface to meet the second lens surface of first lens may be constant, and a curvature of line segment formed by the second virtual plane surface to meet the second lens surface of first lens may not be constant.

Meanwhile, the shape and the number of plurality of support legs (209) illustrated in FIGS. 7 to 10 are a detailed exemplary embodiment that connects the first lens and the light receiving part, and it should be noted that other types of shapes or other number of support legs comprised in the first lens are not excluded.

In all, the first lens according to the first exemplary embodiment may increase efficiency of light incident on at all angles of optical angles using only a lens to a predetermined level, without a mechanical element such as a motor, and light that has passed through a lens via a lens of defocusing method is allowed to have a predetermined area on a sensor surface, such that even if an incident angle is increased, the efficiency of light can be maintained to above a predetermined level, whereby the first lens may be adequate to a sensor reacting to a quantity of light above a predetermined level.

Hereinafter, structure of first lens according to the first exemplary embodiment will be described in detail with reference to FIGS. 1 to 10.

The first lens (200) according to the first exemplary embodiment may comprise a first lens surface (201) for receiving light from outside, and a second lens surface (202) for changing a path of the light received by the first lens surface (201) and outputting the light to the outside. In addition, the first lens (200) may further comprise a first plane surface (203), a second plane surface (204), a third plane surface (205), a fourth plane surface (206) and a fifth plane surface.

The first lens surface (201) and the second lens surface (202) may be respectively an optical surface through which light passes. The first plane surface (203), the second plane surface (204) and the fifth plane surface may be respectively a plane surface generated while the first lens (200) is manufactured. The third plane surface (205) and the fourth plane surface (206) may be respectively a connection surface for connecting the first lens surface (201) and the second lens surface (202).

The sensor (240) may be incident on by light having passed the second lens surface (202). Furthermore, a focus of first lens (200) may be characterized by being deviated (defocused) from the sensor surface (241) of the sensor (240). It is preferable that the focus of the first lens (200) be deviated from the sensor surface (241) of the sensor (240) to an optic axis direction. That is, a distance from a principal point of the first lens (200) to the sensor surface (241) of the sensor (240) may be longer or shorter than a focal distance.

The first lens surface (201) may comprise a first spherical surface (201-1). The first lens surface (201) may take a hemispheric shape, whereas the second lens surface (202) may comprise a first aspherical surface (202-1), a second aspherical surface (202-2) and a third aspherical surface (202-3). The second lens surface (202) may be an aspherical surface.

The first aspherical surface (202-1) may be disposed at a distal end of one side to a minor axis direction (y axis) of first lens (200), the third aspherical surface (202-3) may be disposed at a distal end of other side to a minor axis direction (y axis) of first lens (200), and the second aspherical surface (202-2) may be disposed between the first aspherical surface (202-1) and the third aspherical surface (202-3).

Referring to FIG. 3, between the first aspherical surface (202-1) and the second aspherical surface (202-2), there may be existent an inflection point at a cross-section to a minor axis direction (y axis) of first lens (200), and between the third aspherical surface (202-3) and the second aspherical surface (202-2), there may be existent an inflection point at a cross-section to a minor axis direction (y axis) of the first lens (200).

Referring now to FIGS. 2 and 3, the first spherical surface (201-1), the first aspherical surface (202-1), the second aspherical surface (202-2) and the third aspherical surface (202-3) may be formed with a convex curvature to a direction opposite to a direction disposed with the sensor (240) on a cross-section to a major axis direction (x axis) of first lens (200), and the second aspherical surface (202-2) may be formed with a convex curvature to a direction disposed with the sensor (240) on a cross-section to a minor axis direction (y axis) of first lens (200).

The first spherical surface (201-1) may have a positive (+) refractive power on a cross-section to a major axis direction (x axis) of first lens (200). The first aspherical surface (202-1), the second aspherical surface (202-2) and the third aspherical surface (202-3) may have a negative (−) refractive power on a cross-section to a major axis direction (x axis) of the first lens (200).

The first spherical surface (201-1) and the second aspherical surface (202-2) may have a positive (+) refractive power on a cross-section to a minor axis direction (y axis) of the first lens (200). The first aspherical surface (202-1) and the third aspherical surface (202-3) may have a negative (−) refractive power on a cross-section to a minor axis direction (y axis) of the first lens (200). The second aspherical surface (202-2) may have a positive (+) refractive power on a cross-section to a minor axis direction (y axis) of first lens (200).

Now, referring to FIGS. 9 and 10, the first lens (200) may comprise a first plane surface (203) disposed between a distal end of one side to a minor axis direction (y axis) of first lens (200) on the first spherical surface (201-1) and a distal end of one side to a minor axis direction (y axis) of first lens (200) on the first aspherical surface (202-1).

Furthermore, the first lens (200) may comprise a second plane surface (204) disposed between a distal end of the other side to a minor axis direction (y axis) of first lens (200) on the first spherical surface (201-1) and a distal end of the other side to a minor axis direction (y axis) of first lens (200) on the third aspherical surface (202-1).

The first plane surface (203) and the second plane surface (204) may be perpendicular to a minor axis (y axis) of first lens (200). The first plane surface (203) and the second plane surface (204) may be a surface generated when the first lens (200) is manufactured by molding. A jig, a sliding mold or a fixing mold is arranged in order to fix the first lens (200) in the molding process and after the molding, the first lens (200) may be generated with a first plane surface (203) and the second plane surface (204).

Referring to FIGS. 9 and 10, the first lens (200) may comprise a third plane surface (205) disposed between a distal end of one side to a major axis direction (x axis) of first lens (200) on the first spherical surface (201-1) and a distal end of one side to a major axis direction (x axis) of first lens (200) on the first aspherical surface (202-1), the second aspherical surface (202-2) and the third aspherical surface (202-3).

Furthermore, the first lens (200) may comprise a fourth plane surface (206) disposed between a distal end of the other side to a major axis direction (x axis) of first lens (200) on the first spherical surface (201-1) and a distal end of the other side to a major axis direction (x axis) of first lens (200) on the first aspherical surface (202-1), the second aspherical surface (202-1) and a third aspherical surface (202-3).

The third plane surface (205) and the fourth plane surface (206) may be perpendicular to a major axis of the first lens (200). The third plane surface (205) and the fourth plane surface (206) may be a surface for connecting the first lens surface (201) and the second lens surface (202) and for supporting the first lens (200). To this end, the third plane surface (205) and the fourth plane surface (206) may be disposed with a plurality of support legs (209).

The first lens (200) may further comprise a fifth plane surface (not shown) disposed between the first spherical surface (201-1) and the third plane surface (205), and a sixth plane surface (not shown) disposed between the first spherical surface (201-1) and the fourth plane surface (206). The fifth plane surface (not shown) and the sixth plane surface (not shown) may be disposed to be symmetrical about an optic axis. The fifth plane surface (not shown) and the sixth plane surface (not shown) may be parallel with an optic axis. The fifth plane surface (not shown) and the sixth plane surface (not shown) may be respectively a cut surface generated when a plurality of first lenses (200) is cut during manufacturing of the plurality of first lens (200) using a molding.

In more detailed explanation using FIGS. 9 and 10, the first lens (200) may further comprise a plurality of support legs (209).

The plurality of support legs (209) may comprise a first support leg (209-1) disposed on the third plane surface (205), a second support leg (209-2) disposed on the third plane surface (205) and spaced apart the first support leg (209-1) to a minor axis direction (y axis) the first lens (200), a third support leg (209-3) disposed on the fourth plane surface (206), and a fourth support leg (209-4) disposed on the fourth plane surface (206) and spaced apart the third support leg (209-3) to a minor axis direction (y axis) of the first lens (200).

Hereinafter, second, third and fourth exemplary embodiments of the present invention will be described in detail with reference to the accompanying drawings. It should be readily apparent to those of skill in the art that the invention may be embodied in other particular shapes within the spirit and scope of the invention.

Figure 11:
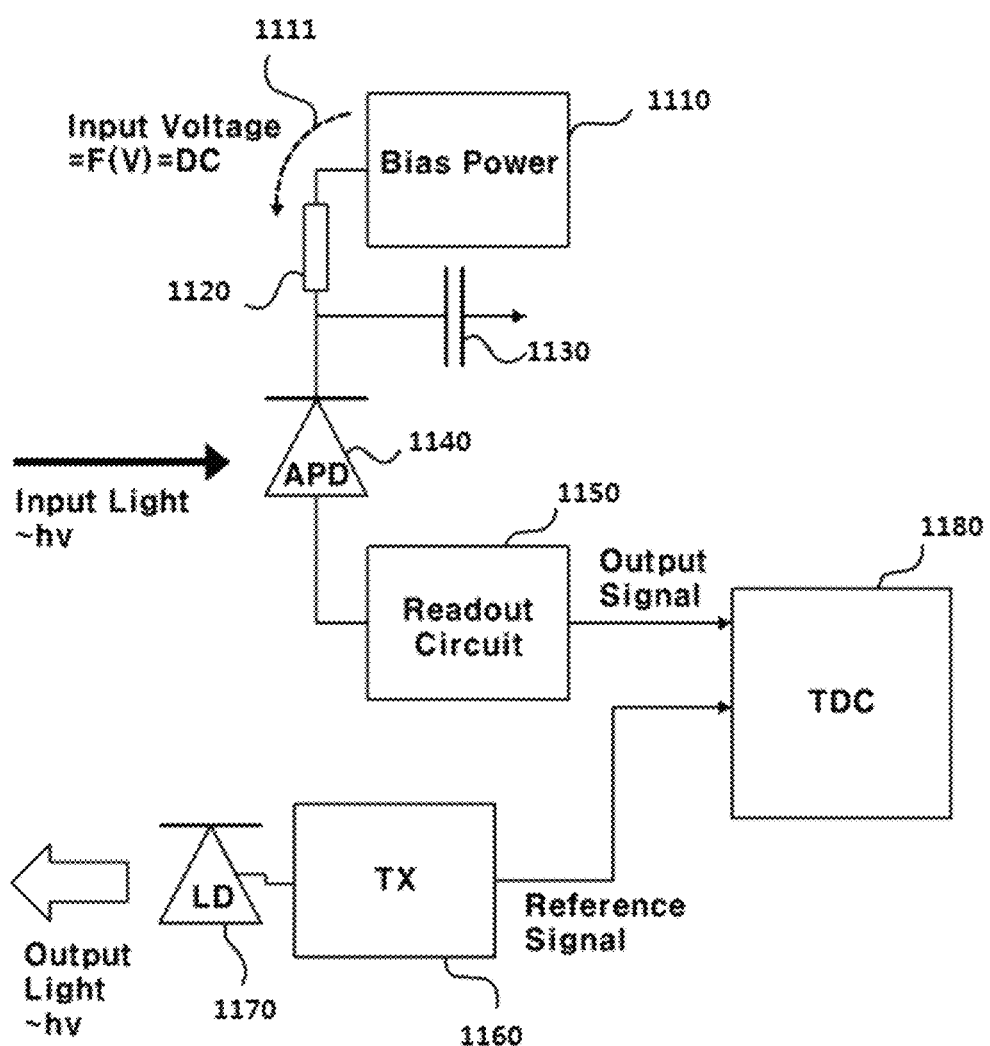
FIG. 11 is a schematic view illustrating an example where an ADP is used as a light receiving element in a conventional Lidar module.

FIG. 11 is a schematic view illustrating an example where an ADP is used as a light receiving element in a conventional Lidar module.

Referring to FIG. 11, the conventional Lidar module may comprise a voltage part (1110), a current limitation resistor (1120), a capacitor (1130), a light receiving element (APD, 1140), a readout circuit (1150), a light emitting part (1160, 1170) and a TDC (Time to Digital Converter, 1180).

First, the light emitting part (1160, 1170) may comprise a light source (1170) outputting a light. Here, the light source (1170) may be a laser diode and the laser diode (LD) may output a laser beam.

Meantime, although the light source (1170, 1470, 1570, 1670) in FIGS. 11 to 19 is illustrated as one laser diode (LD), the light source (1170, 1470, 1570, 1670) is illustrated as one laser diode (LD) for the convenience of explanation related to the present invention, and it should be noted that a plurality of light sources (laser diodes) may be comprised in the light-emitting device according to the present invention, the idea of which is not ruled out.

Furthermore, the voltage part (1110) may be an element for applying (or providing) a bias voltage (1111) to a light receiving element (1140), where the size of voltage applied to the light receiving element (1140) may be determined by a current limitation resistor (1120) and the capacitor (1130).

Likewise, although the light receiving element (1140, 1440, 1540, 1640) is also illustrated as one avalanche photo diode (APD) in FIGS. 11 to 19, the light receiving element (1140, 1440, 1540, 1640) is illustrated as one APD for the convenience of explanation of the present invention, and it should be noted that the light-receiving device may be comprised with a plurality of light receiving elements according to the present invention, the idea of which is not ruled out.

The readout circuit (1150) may transmit a signal corresponding to a light detected by the light receiving element (1140) to the TDC (1180), and a Tx terminal (1160) comprised in the light emitting part (1160, 1170) may also transmit a reference signal corresponding to a light outputted by the light source (1170) to the TDC (1180).

Figure 12:
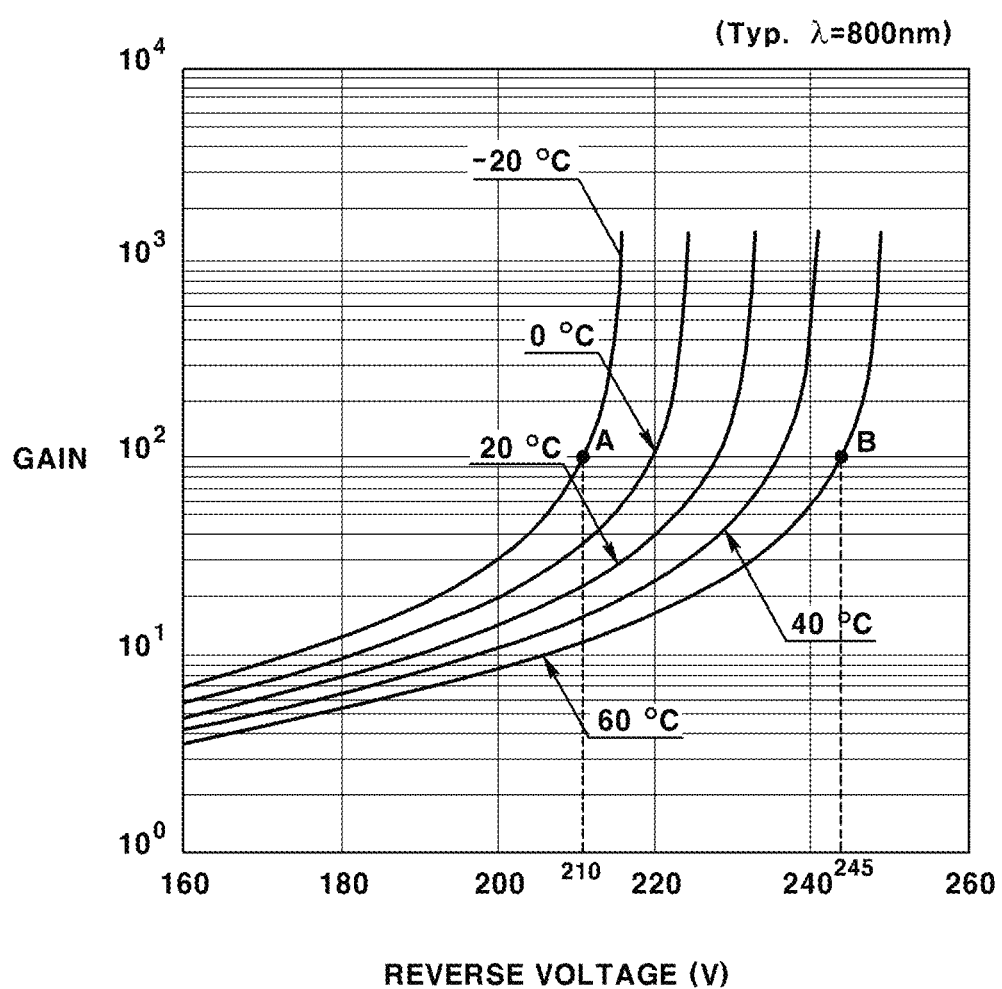
FIG. 12 is a schematic view illustrating an example where a gain is changed in response to changes in temperature of a conventional Lidar module of FIG. 11 or to a bias voltage.

Particularly, the bias voltage of voltage part (1110) and gains of light receiving elements (APD, 1140) may maintain a predetermined relationship, the details of which will be continuously explained using FIG. 12.

FIG. 12 is a schematic view illustrating an example where a gain is changed in response to changes in temperature of a conventional Lidar module of FIG. 11 or to a bias voltage.

A relationship can be ascertained from FIG. 12 between a bias voltage (X axis) applied to the light receiving element (to be more specific, the APD) and a gain (Y axis) of APD in a light of a particular wavelength (λ=800 nm). In addition, changes in the relationship between a relevant bias voltage (X axis) and a gain (Y axis) depending on ambient temperature can be also ascertained.

Referring to FIG. 12, it can be noted that a bias voltage applied to the APD must be increased from about 210V to about 245V in order to obtain a same gain (e.g., 100) when a gain axis (Y axis) is fixed at 100, and a temperature is increased (A to B) from −20° Celsius to 40° Celsius.

Meantime, based on an APD temperature condition is 0° Celsius and a bias voltage is 200V, and in order to obtain a gain corresponding to a range of 10 to 100, it can be noted that, based on a 200V bias voltage applied to the APD, about 180V-220V bias voltage corresponding to about 20V in APD fluctuation width must be applied to the APD.

That is, in order to adjust (or control) a gain of APD under a predetermined temperature condition and in a light of particular wavelength, it can be noted that a change in bias voltage is required. As a result, the second exemplary embodiment proposes a light-receiving device in which a gain of APD is changed according to the change in the bias voltage and a dynamic range can be controlled as a result thereof.

Figure 13:
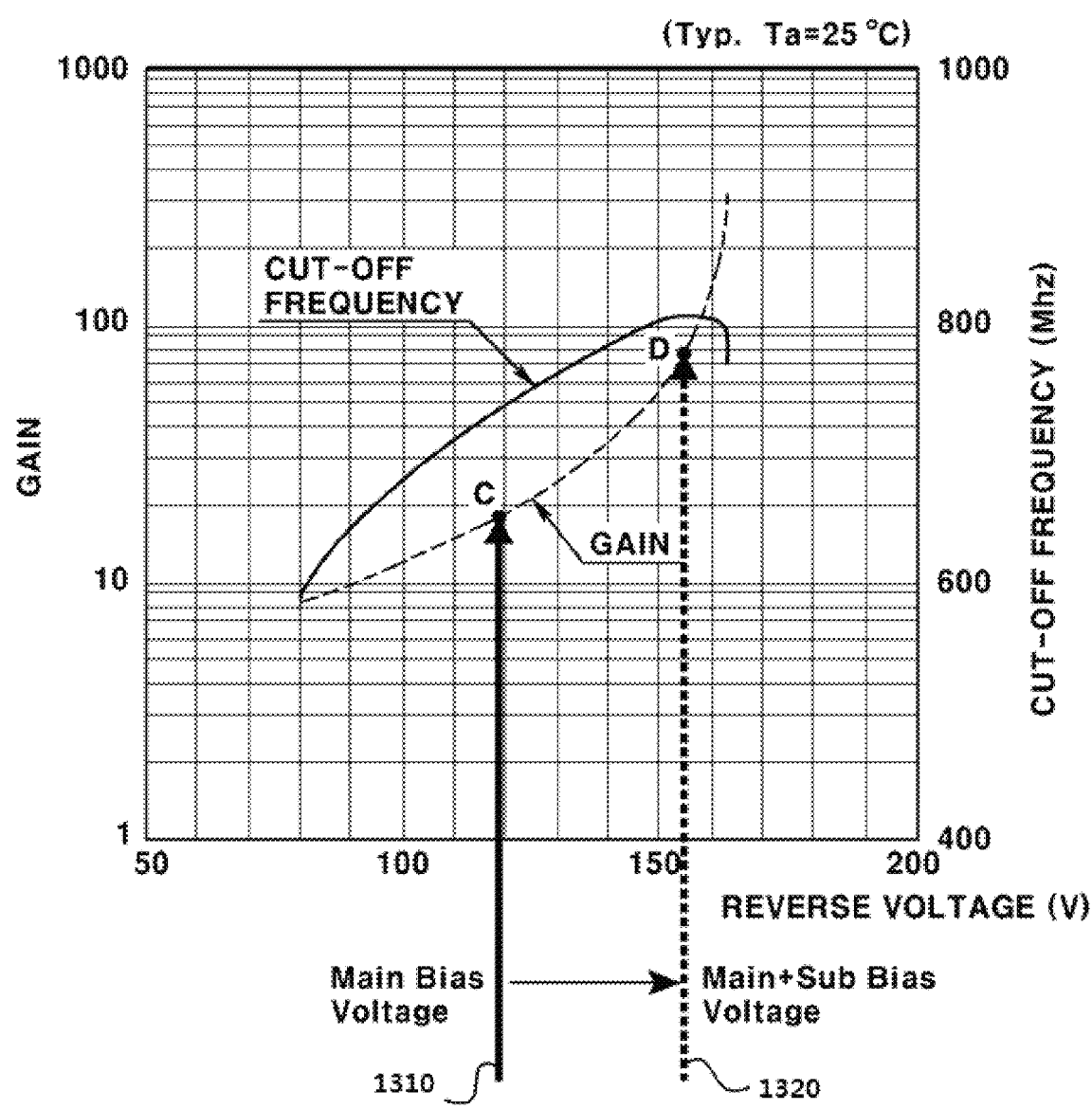
FIG. 13 is a schematic view illustrating an example where a gain of an APD is increased in response to changes in bias voltage when a temperature is constant in a light-receiving device for increasing a dynamic range according to a second exemplary embodiment of present invention.

FIG. 13 is a schematic view illustrating an example where a gain of an APD is increased in response to changes in bias voltage when a temperature is constant in a light-receiving device for increasing a dynamic range according to a second exemplary embodiment of present invention.

Referring to FIG. 13, it can be ascertained from FIG. 13 that under a constant temperature condition (25° Celsius), the relationship among a bias voltage (X axis) applied to the light receiving element (to be more specific, APD), a gain of APD (Y axis at left side) and a cut-off frequency (Y axis at right side).

In more detail, in order to obtain a gain in which a gain of APD is increased (from C to D) from about 20 to about 80, it can be noted that a bias voltage applied to the APD is increased from about 120V (310) to about 155V (320).

Because, in the bias voltage thus increased, a frequency of light measured in response to the APD is also increased, and the increased frequency is a frequency smaller that a cut-off frequency, the APD comprised in the light-receiving device in response to the increased bias voltage may be used for measurement of small quantity of light and for measurement of large quantity of light as well according to the second exemplary embodiment.

All in all, the second exemplary embodiment can be used to prevent the generation of dead zone immeasurable by the conventional Lidar module and as a result, the dynamic range can be increased.

Figure 14:
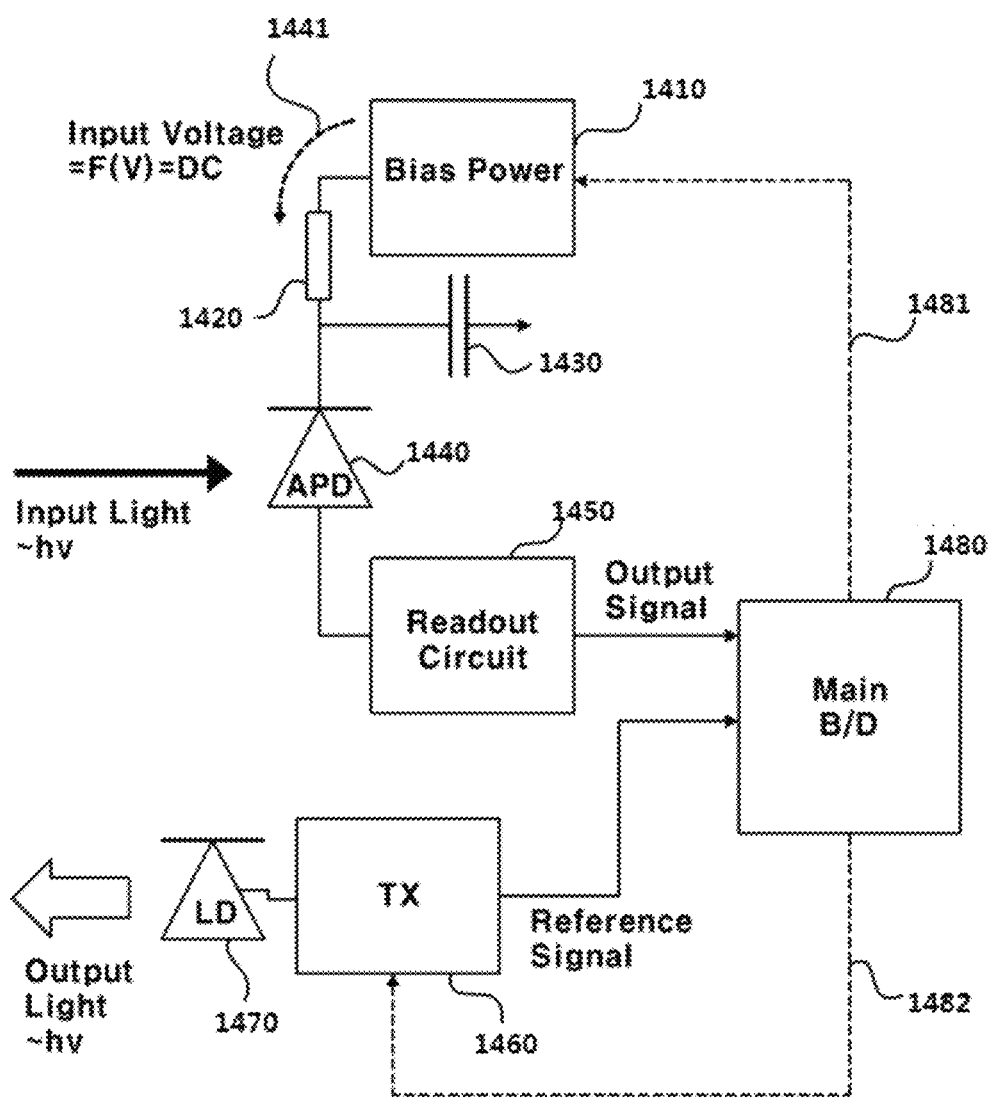
FIG. 14 is a schematic view illustrating an optical device according to a second exemplary embodiment of present invention.

FIG. 14 is a schematic view illustrating an optical device according to a second exemplary embodiment of present invention.

Referring to FIG. 14, a Lidar module comprising an optical device according to the present invention may comprise a voltage part (1410), a current limitation resistor (1420), a capacitor (1430), a light receiving element (APD, 1440), a readout circuit (1450), a light emitting part (1460, 1470) and a controller (Main B/D, 1480).

However, the optical device and Lidar module explained through FIGS. 4 to 6, in introducing a particular function according to the present invention, are illustrated only with the essential elements, and therefore it should be readily apparent to those of skill in the art that various other elements may be comprised in the optical device and the Lidar module.

The current limitation resistor (1420), the capacitor (1430), the light receiving element (APD, 1440), the readout circuit (1450), and the light emitting part (1460, 1470) illustrated in FIG. 14 are substantially same as those already explained in FIG. 11, such that any redundant explanation thereto will be omitted, and the voltage part (1410) and the controller (1480) will be explained which are the characteristic elements of optical device according to the present invention.

The voltage part (1410) may be an element for providing (or applying) a voltage necessary for operation of the light receiving element (1440) detecting a light that is transmitted by being reflected from a subject, and may output (1411) a first bias voltage or a second bias voltage.

Here, the second bias voltage may be a voltage in which a sub voltage is added to the first bias voltage. Furthermore, the first bias voltage may be a DC voltage between about 10V to 300V, and may be changed in value depending on temperature, as explained in FIG. 12.

In more detailed explanation thereto, the first bias voltage may be a 130V which is a bias voltage at C point explained through FIG. 13, and the second bias voltage may a 155V, which is a bias voltage at D point of FIG. 3. In this case, the sub bias voltage may be about 35V.

Meantime, the bias voltage illustrated in FIG. 13 illustrates an example in which the second bias voltage is increased through the sub bias voltage, through which the exemplary embodiment of FIG. 14 can be explained, but conversely, when the sub bias voltage is a negative (−) voltage, it should be apparent that the second bias voltage may be smaller than the first bias voltage, and the light-receiving device according to the present invention does not rule out this example.

The controller (1480) may be an element for controlling an operation of the voltage part (1410). To be more specific, the controller (1480) may control the voltage part (1410) so that the second bias voltage in the first bias voltage provided from the voltage part (1410) and the second bias voltage is synchronized with an optical output of the light emitting part (1460, 1470) to be provided (1441) to the light receiving element (1440).

Toward this end, the controller (1480) may simultaneously input a seed signal (1481, 1482) to the Tx terminal (1460) comprised in the light emitting part (1460, 1470) and to the voltage part (1410), and as a result, the voltage part (1410) may output (1441) the second bias voltage based on a time when a relevant seed signal (1481) is inputted.

All in all, the light-receiving device of the present invention in response to the operation of the controller (1480) may selectively increase (or control) a gain of the light receiving element (1440) only in a case when a light is outputted from the light source (1470) comprised in the light-emitting device (1460, 1470).

That is, a dynamic range can be effectively increased (or controlled) in a Lidar module using the APD as a light receiving element according to the present invention.

Meantime, the sub bias voltage may be changed in response to the characteristics of APD used as a light receiving element, but it is preferable that the sub bias voltage be comprised in a range of maximum +50V to −50V, and may comprise an AC or pulse type voltage that changes relative to a time.

Furthermore, when the sub bias voltage is an AC or pulse type voltage, a median value of sub bias voltage may be positioned between about −50V to about 100V, and the type thereof may be changed to a linear shape or a stair shape.

Figure 15:
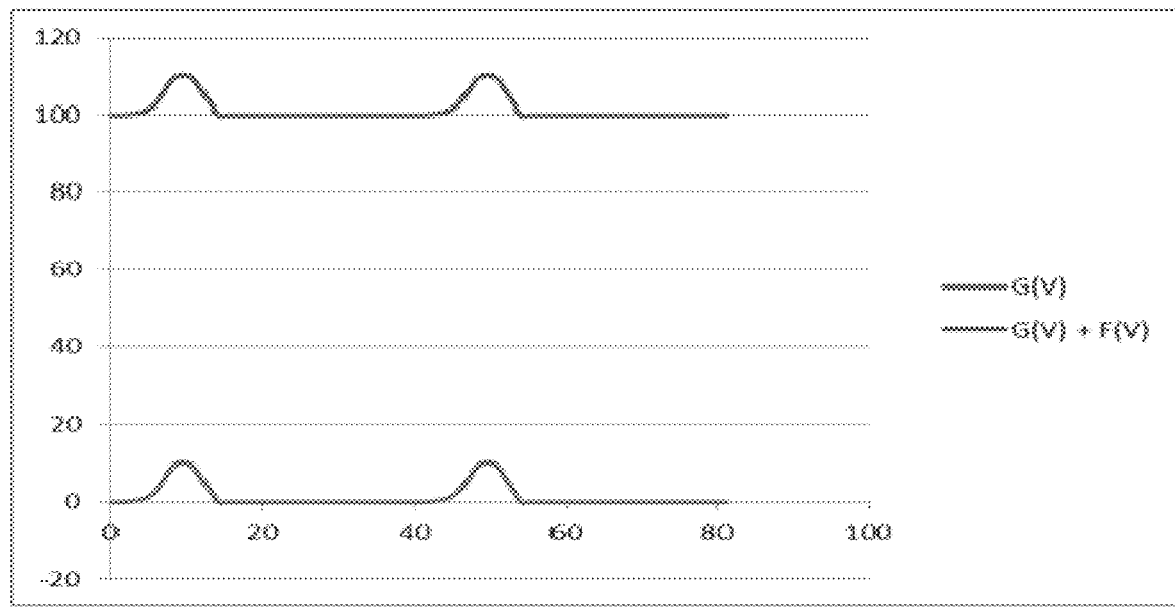
FIGS. 15 to 17 are schematic views illustrating a sub bias voltage applied to a light receiving element in the optical device of FIG. 14 and a second bias voltage thereof.
Figure 16:
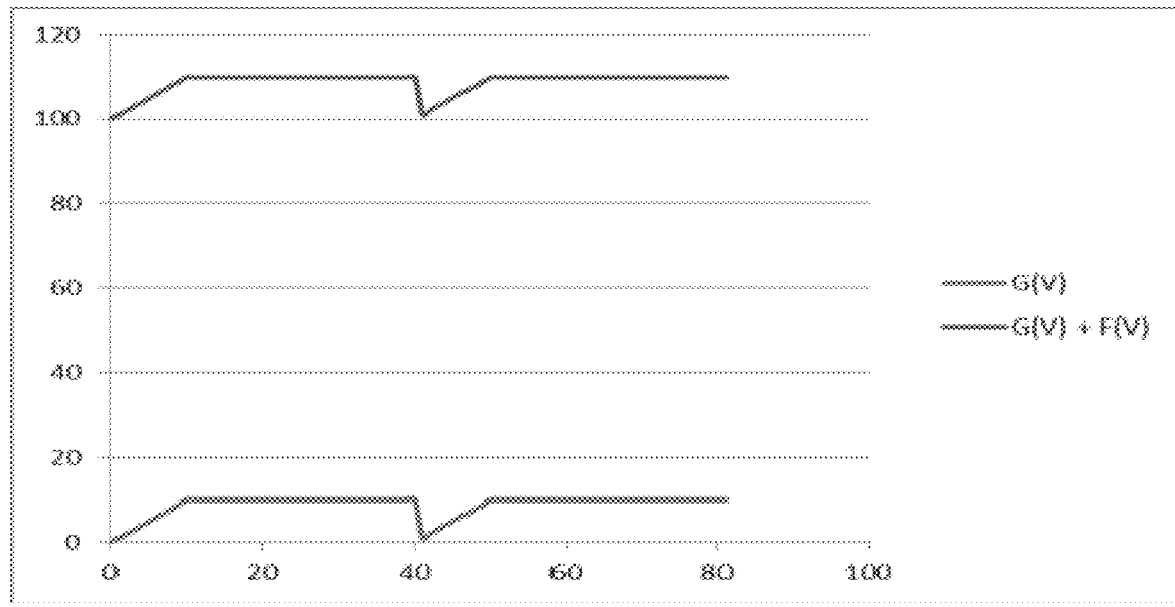
Figure 17:
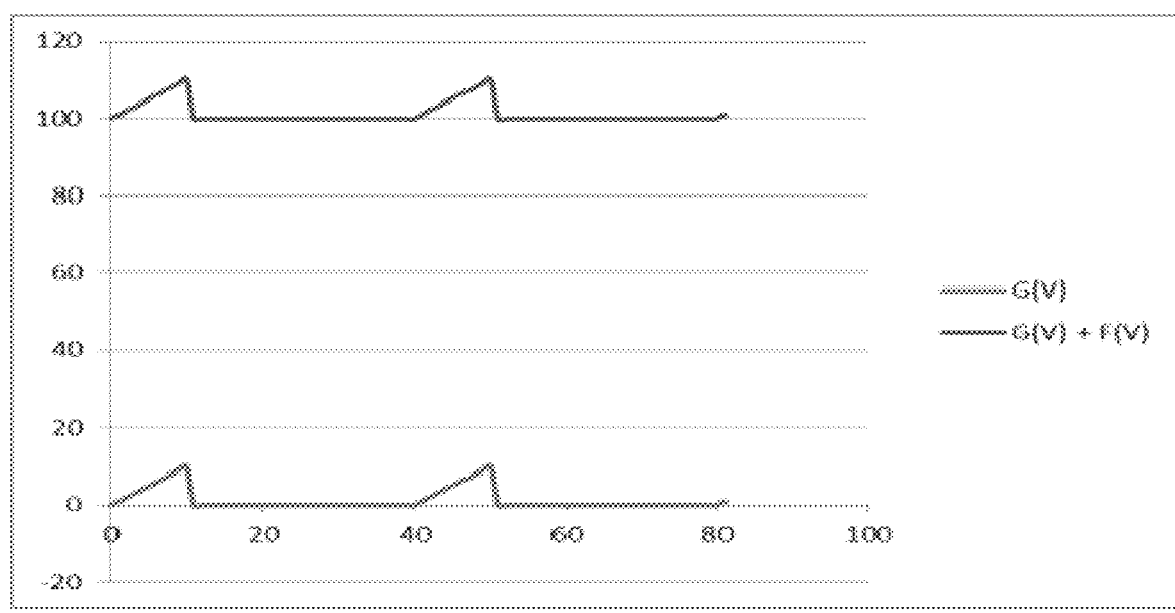

FIGS. 15 to 17 are schematic views illustrating a sub bias voltage applied to a light receiving element in the optical device of FIG. 14 and a second bias voltage thereof.

Referring to FIGS. 15, 16 and 17, Y axis in the graph denotes a voltage, and X axis denotes a time. Moreover, G(V) denotes an example of sub bias voltage, and G(V)+F (V) denotes an example of second bias voltage.

To be more specific, FIGS. 15 to 17 may illustrate a second bias voltage {G(V)+F(V)} added by a sub bias voltage corresponding to G(V) when the first bias voltage {F(V)} is 100V.

Figure 18:
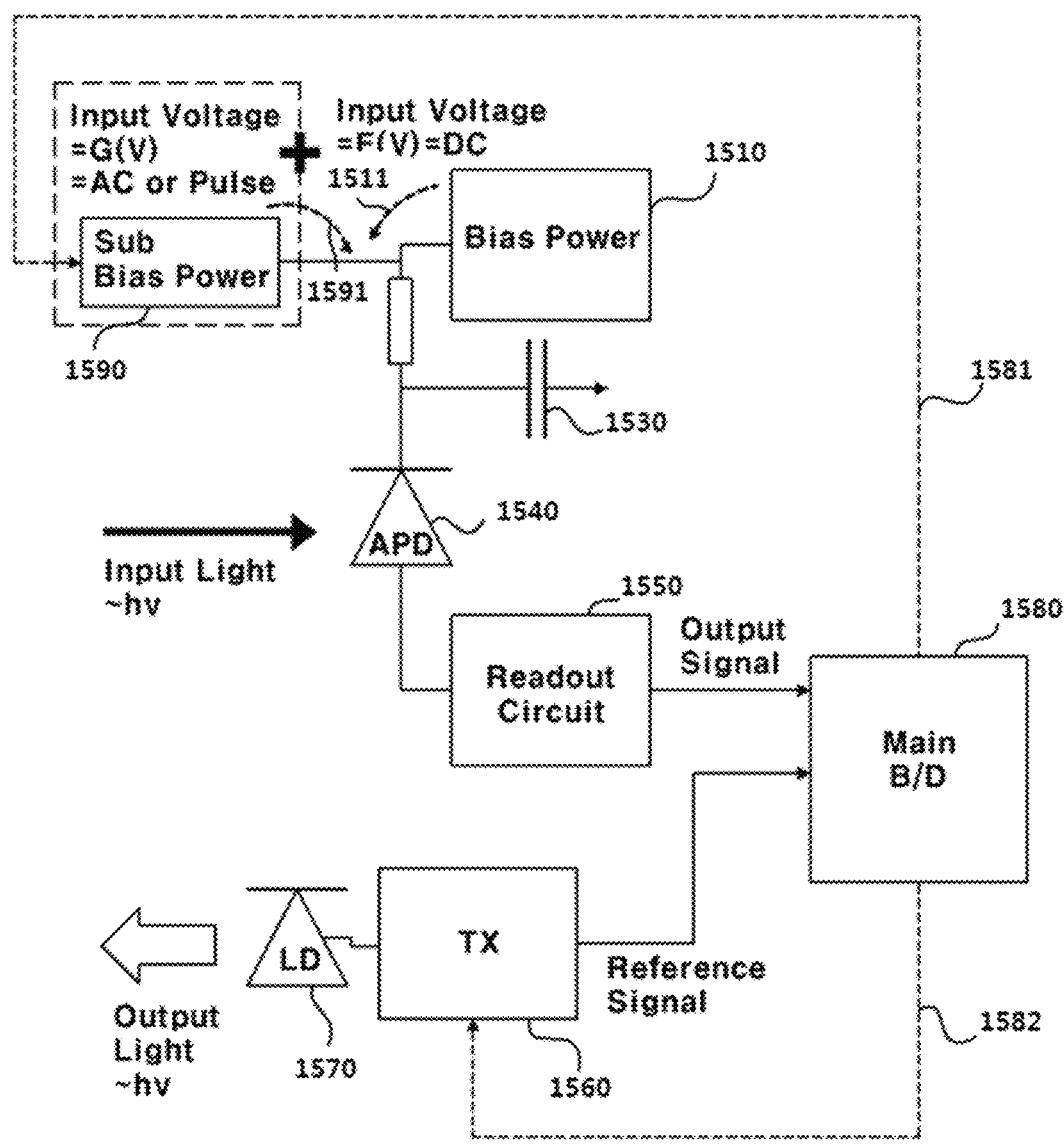
FIG. 18 is a schematic view illustrating a Lidar module according to a third exemplary embodiment of present invention.

FIG. 18 is a schematic view illustrating a Lidar module according to a third exemplary embodiment of present invention.

Referring to FIG. 18, the Lidar module according to the present invention may comprise a first voltage part (1510), a current limitation resistor (1520), a capacitor (1530), a light receiving element (APD, 1540), a readout circuit (1550), a light emitting part (1560, 1570), a controller (Main B/D, 1580) and a second voltage part (1590).

The current limitation resistor (1520), the capacitor (1530), the light receiving element (APD, 1540), the readout circuit (1550), and the light emitting part (1560, 1570) illustrated in FIG. 18 are substantially same as those already explained in FIGS. 11 and 14, such that any redundant explanation thereto will be omitted, and the first voltage part (1510), the controller (1580) and the second voltage part (1590) will be explained which are the characteristic elements.

The first voltage part (1510) and the second voltage part (1590) may be respectively an element for providing (or applying) a voltage necessary for operation of the light receiving element (1540) detecting a light that is transmitted by being reflected from a subject.

To be more specific, the first voltage part (1510) may provide a bias voltage (1511) to the light receiving element and the second voltage part (1590) may provide a sub bias voltage (1591) to the light receiving element.

Here, the voltage applied to the light receiving element (APD, 1540) may be a voltage in which the bias voltage (1511) provided by the first voltage part (1510) is added by the sub bias voltage (1591) provided by the second voltage part (1590). Furthermore, the bias voltage (1511) provided from the first voltage part (1510) may be a DC voltage between about 10V to 300V, and may be changed in value depending on temperature, as explained in FIG. 12.

In more detailed explanation thereto, the bias voltage provided from the first voltage part (1510) may be a 120V which is a bias voltage at C point explained through the abovementioned FIG. 13, and the bias voltage may about 35V, which is a difference (subtraction) between 155V which is a bias voltage at D point of FIG. 13 and 120V which is a bias voltage at C point.

That is, one end of the light receiving element (APD, 1540) at D point may be applied with about 155V in which, a 120V which is a bias voltage (1511) provided from the first voltage part (1510) is added by 35V which is the sub bias voltage (1591). As a result, the light receiving element (APD, 1540) may operate while having about a 80-gain at a cut-off frequency of about 800 Mhz.

The controller (1580) may be an element for controlling an operation of the second voltage part (1590). To be more specific, the controller (1580) may control the second voltage part (1590) so that the bias voltage (1591) provided by the second voltage part (1590) is synchronized with an optical output of the light emitting part (1560, 1570) to be provided to the light receiving element (1540).

Toward this end, the controller (1580) may simultaneously input a seed signal (1581, 1582) to a Tx terminal (1560) comprised in the light emitting part (1560, 1570) and to the second voltage part (1590), and as a result, the second voltage part (1590) may output the sub bias voltage based on a time when a relevant seed signal (1581) is inputted.

All in all, the Lidar module of the present invention in response to the operation of the controller (1580) may selectively increase (or control) a gain of the light receiving element (1540) only in a case when a light is outputted from the light source (1570) comprised in the light-emitting device (1560, 1570).

Figure 19:
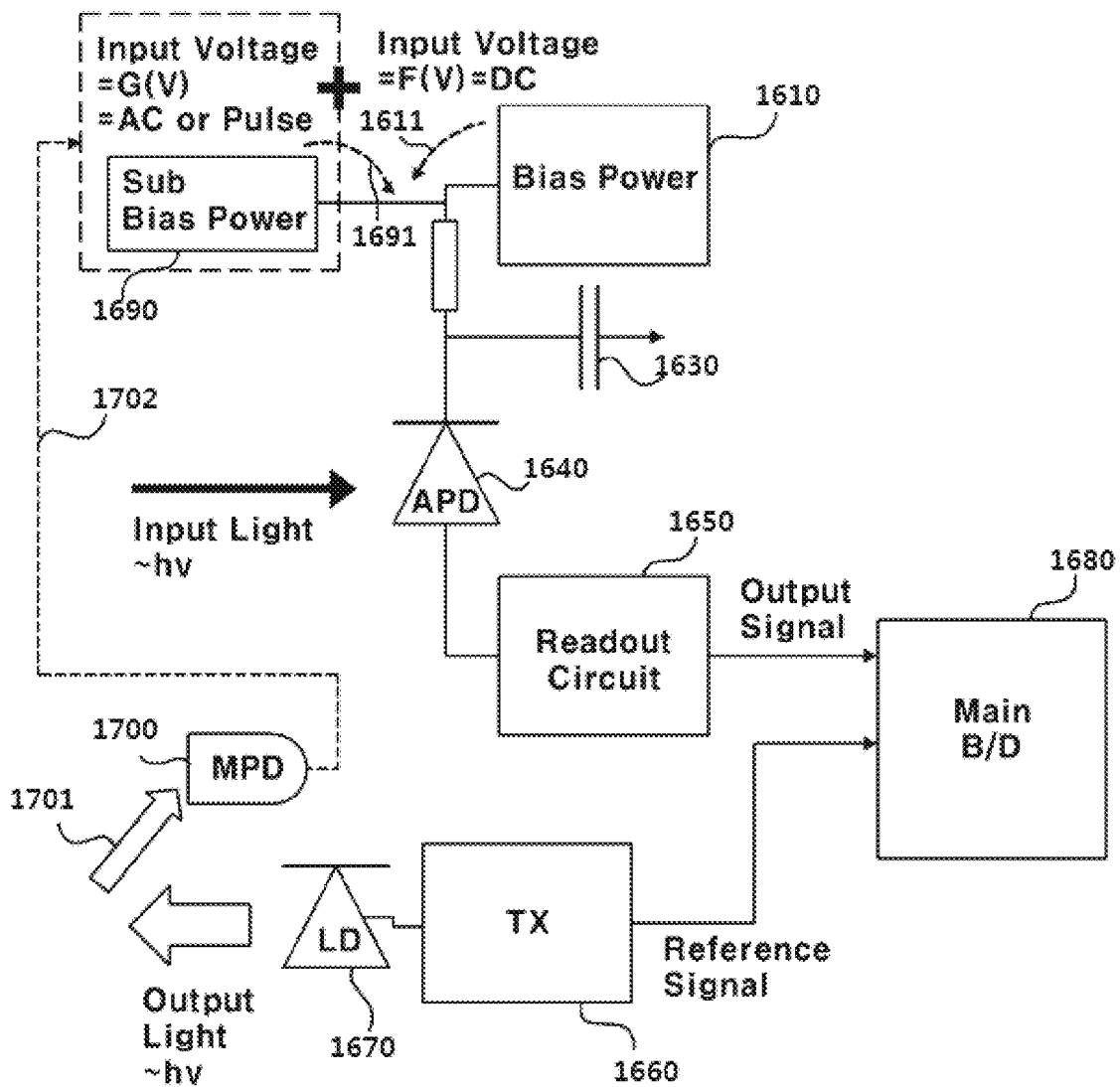
FIG. 19 is a schematic view illustrating a Lidar module according to a fourth exemplary embodiment of present invention.

FIG. 19 is a schematic view illustrating a Lidar module according to a fourth exemplary embodiment of present invention.

Referring to FIG. 19, the Lidar module according to the present invention may comprise a first voltage part (1610), a current limitation resistor (1620), a capacitor (1630), a light receiving element (APD, 1640), a readout circuit (1650), a light emitting part (1660, 1670), a controller (Main B/D, 1680), a second voltage part (1690) and a monitoring photo diode (MPD, 1700).

The current limitation resistor (1620), the capacitor (1630), the light receiving element (APD, 1640), the readout circuit (1650), and the light emitting part (1660, 1670) illustrated in FIG. 19 are substantially same as those already explained in FIGS. 11 and 18, such that any redundant explanation thereto will be omitted, and the first voltage part (1610), the second voltage part (1690) and the monitoring photo diode (MPD, 1700) will be explained.

The first voltage part (1610) and the second voltage part (1690) may be respectively an element for providing (or applying) a voltage necessary for operation of the light receiving element (1640) detecting a light that is transmitted by being reflected from a subject.

To be more specific, the first voltage part (1610) may provide a bias voltage (1611) to the light receiving element and the second voltage part (1690) may provide a sub bias voltage (1691) to the light receiving element.

Here, the voltage applied to the light receiving element (APD, 1640) may be a voltage in which the bias voltage (1611) provided by the first voltage part (1610) is added by the sub bias voltage (1691) provided by the second voltage part (1690). Furthermore, the bias voltage (1611) provided from the first voltage part (1610) may be a DC voltage between about 10V to about 300V, and may be changed in value depending on temperature, as explained in FIG. 12.

In more detailed explanation thereto, the bias voltage (1611) provided from the first voltage part (1610) may be a 120V which is a bias voltage at C point explained through the abovementioned FIG. 13, and the sub bias voltage (1691) supplied from the second voltage part (1690) may about 35V, which is a difference (subtraction) between 155V which is a bias voltage at D point of FIGS. 13 and 120V which is a bias voltage at C point.

That is, one end of the light receiving element (APD, 1640) at D point may be applied with about 155V in which, a 120V which is a bias voltage (1611) provided from the first voltage part (1610) is added by 35V which is the sub bias voltage (1691). As a result, the light receiving element (APD, 1640) may operate while having about a 80-gain at a cut-off frequency of about 800 Mhz.

Furthermore, the monitoring photo diode (MPD, 1700) is an element for controlling an operation of the second voltage part (1690). To be more specific, the MPD (1700) may detect (1701) an optical output outputted from the light emitting part (1660, 1670), and control (1702) the second voltage part (1690) so that the sub bias voltage (1691) provided by the second voltage part (1690) is synchronized with an optical output of the light emitting part (1660, 1670) to be provided to the light receiving element (1640).

Toward this end, the MPD (1700) may input a seed signal (1702) to the second voltage part (1690) in response to a part of detected optical output (1701) in the optical outputs outputted from the light emitting part (1660, 1670), and as a result, the second voltage part (1690) may output the sub bias voltage (1691) based on a time when a relevant seed signal (1702) is inputted.

All in all, the Lidar module of the present invention in response to the operation of the MPD (1700) may selectively increase (or control) a gain of the light receiving element (1640) only in a case when a light is outputted from a light source (1670) comprised in the light-emitting device (1660, 1670).

That is, according to the third and fourth exemplary embodiments illustrated in FIGS. 18 and 19, a dynamic range can be effectively increased (or controlled) in a Lidar module using the APD as a light receiving element.

Meanwhile, although the sub bias voltage may be changed in response to the characteristics of the used APD, it is preferable that the sub bias voltage be comprised within a maximum range of +50V to −50V, and may comprise an AC or pulse type voltage that changes to a time.

Furthermore, when the sub bias voltage is an AC or pulse type voltage, a median value of sub bias voltage may be positioned between about −50V to about 100V, and the type thereof may be changed to a linear shape or a stair shape, the explanation of which has been already elaborated through FIG. 14.

All in all, the light-receiving device for increasing the dynamic range according to the second, third and fourth exemplary embodiments can increase the dynamic range by changing a gain of light receiving element, and when an APD is used as a light receiving element, a dead zone problem that fails to react to a relatively large quantity of light can be solved.

The hitherto detailed explanations should not be limitedly construed in all respects and should be considered as exemplary. The scope of present invention should be determined by a rational interpretation of attached claims, and all changes within the equivalent scope of the present invention should be comprised in the scope of the present invention.

What is claimed is:

1. An optical device, comprising:
   a light receiving element for detecting light reflected and transmitted from a subject;
   a voltage part for providing a first bias voltage or a second bias voltage to the light receiving element; and
   a controller for controlling the voltage part so that the second bias voltage provided from the voltage part is synchronized with a light output of a light emitting part to be provided to the light receiving element,
   wherein the second bias voltage comprises a voltage in which a sub bias voltage is added to the first bias voltage.

2. The optical device of claim 1, wherein the sub bias voltage is comprised in a range from −50V to +50V.

3. The optical device of claim 1, wherein the sub bias voltage comprises AC voltage or pulse-shaped voltage that changes with respect to time.

4. The optical device of claim 3, wherein a median value of the sub bias voltage is positioned between −50V to 100V.

5. The optical device of claim 3, wherein a shape of the sub bias voltage is changed to a linear shape or a stair shape.

6. The optical device of claim 1, wherein the controller inputs a seed signal to the light emitting part and the voltage part simultaneously, and
wherein the voltage part outputs the second bias voltage based on a time when the seed signal is inputted.

7. The optical device of claim 1, wherein the light emitting part comprises at least one laser diode.

8. The optical device of claim 1, wherein the light receiving element comprises at least one avalanche photo diode.

9. A Lidar module comprising:
a light receiving element for detecting light reflected and transmitted from a subject;
a first voltage part for providing a bias voltage to the light receiving element;
a second voltage part for providing a sub bias voltage to the light receiving element; and
a controller for controlling the second voltage part so that the sub bias voltage is synchronized with a light output of a light emitting part to be provided to the light receiving element.

10. A Lidar module comprising:
a light receiving element for detecting light reflected and transmitted from a subject;
a first voltage part for providing a bias voltage to the light receiving element;
a second voltage part for providing a sub bias voltage to the light receiving element; and
a monitoring photo diode (MPD) for detecting a light output outputted from a light emitting part and controlling the second voltage part so that the sub bias voltage is synchronized with the light output to be provided to the light receiving element.

11. The Lidar module of claim 9, wherein the sub bias voltage is comprised in a range from −50V to +50V.

12. The Lidar module of claim 9, wherein the sub bias voltage comprises AC voltage or pulse-shaped voltage that changes with respect to time.

13. The Lidar module of claim 12, wherein a median value of the sub bias voltage is positioned between −50V to 100V.

14. The Lidar module of claim 12, wherein a shape of the sub bias voltage is changed to a linear shape or a stair shape.

15. The Lidar module of claim 9, wherein the light emitting part comprises at least one laser diode.

16. The Lidar module of claim 9, wherein the light receiving element comprises at least one avalanche photo diode.

17. The Lidar module of claim 16, wherein the sub bias voltage is changed according to characteristics of the avalanche photo diode.

18. The Lidar module of claim 9, wherein the controller inputs a seed signal to the light emitting part and the voltage part simultaneously, and
wherein the second voltage part outputs the sub bias voltage based on a time when the seed signal is inputted.

19. The Lidar module of claim 10, wherein the monitoring photo diode inputs a seed signal to the second voltage part in response to the detected light output, and
wherein the second voltage part outputs the sub bias voltage based on a time when the seed signal is inputted.

* * * * *